(12) United States Patent
Eastes

(10) Patent No.: US 12,481,698 B2
(45) Date of Patent: Nov. 25, 2025

(54) TIME TRAVEL SEARCH USING DIGITAL CONTENT SNAPSHOTS

(71) Applicant: Dropbox, Inc., San Francisco, CA (US)

(72) Inventor: Mike Eastes, Lakeville, MN (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/419,331

(22) Filed: Jan. 22, 2024

(65) Prior Publication Data

US 2025/0238465 A1  Jul. 24, 2025

(51) Int. Cl.
*G06F 16/70* (2019.01)
*G06F 16/732* (2019.01)
*G06F 16/738* (2019.01)
*G06F 16/783* (2019.01)

(52) U.S. Cl.
CPC ........ *G06F 16/7335* (2019.01); *G06F 16/738* (2019.01); *G06F 16/7844* (2019.01)

(58) Field of Classification Search
CPC . G06F 16/7335; G06F 16/7844; G06F 16/738
See application file for complete search history.

(56) References Cited

U.S. PATENT DOCUMENTS

| | | | | |
|---|---|---|---|---|
| 9,886,461 B1 * | 2/2018 | Sharifi | ............... | G06Q 10/1097 |
| 11,354,198 B2 * | 6/2022 | Novotny | ............... | H04L 9/3239 |
| 11,704,230 B2 * | 7/2023 | Shang | ................ | G06F 11/3672 |
| | | | | 717/126 |
| 11,762,898 B1 * | 9/2023 | Anbalagapandian | ... | G06F 16/44 |
| | | | | 707/738 |
| 2006/0041589 A1 | 2/2006 | Helfman et al. | | |
| 2011/0125735 A1 * | 5/2011 | Petrou | ................ | G06F 16/5838 |
| | | | | 707/723 |
| 2012/0030015 A1 * | 2/2012 | Brunsman | .......... | G06Q 30/0251 |
| | | | | 705/14.49 |
| 2014/0201179 A1 * | 7/2014 | Chang | .................. | G06F 16/951 |
| | | | | 707/706 |
| 2014/0380142 A1 * | 12/2014 | Mikutel | ................. | G06F 9/451 |
| | | | | 715/234 |

(Continued)

FOREIGN PATENT DOCUMENTS

| | | | |
|---|---|---|---|
| WO | WO2013165664 | * | 11/2013 |
| WO | WO2013165664 A1 | * | 11/2013 |

*Primary Examiner* — Daniel A Kuddus
(74) *Attorney, Agent, or Firm* — Keller Preece PLLC

(57) ABSTRACT

The present disclosure relates to systems, non-transitory computer-readable media, and methods for capturing snapshots of digital content displayed on a client device and searching through the captured content. The disclosed systems provide a search function for effectively traveling back in time to identify digital content previously displayed on a client device. The disclosed systems provide options for capturing snapshots of content displayed on a display screen, extracting data from the snapshots, and storing the snapshots for use when populating search results. The disclosed systems utilize machine learning models to extract text and/or to generate text versions of snapshots including extracted text, descriptions of images, transcripts of videos, and/or textual summaries from displayed documents or webpages. In response to a search query, the disclosed systems can produce search results that include digital videos including captured snapshots of content displayed by a client device over time.

20 Claims, 14 Drawing Sheets

(56) References Cited

U.S. PATENT DOCUMENTS

| | | | |
|---|---|---|---|
| 2015/0046779 A1* | 2/2015 | Akselrod | G06F 40/169 |
| | | | 715/202 |
| 2015/0227557 A1* | 8/2015 | Holzschneider | G06F 16/5838 |
| | | | 382/218 |
| 2015/0242104 A1* | 8/2015 | Stokman | G11B 27/031 |
| | | | 707/706 |
| 2015/0380142 A1* | 12/2015 | Cho | H01H 50/36 |
| | | | 335/229 |
| 2016/0259794 A1* | 9/2016 | Hickman | G06F 16/2477 |
| 2018/0144059 A1* | 5/2018 | Saikia | G06F 16/9577 |
| 2018/0330329 A1* | 11/2018 | Anima | G06F 16/48 |
| 2019/0384850 A1* | 12/2019 | Lo | G06F 16/254 |
| 2021/0326515 A1 | 10/2021 | Joshi et al. | |
| 2022/0229811 A1* | 7/2022 | Ramabhadran | H04L 67/306 |

* cited by examiner

TIME TRAVEL SEARCH USING DIGITAL CONTENT SNAPSHOTS

BACKGROUND

Recent years have seen significant improvements in computer hardware and software platforms for generating, searching, and retrieving digital content across a variety of computer applications. For example, the widespread use of computing devices and the ever-expanding capabilities of computer systems have resulted in continuous creation and utilization of digital content across various applications and formats. Consequently, due to the vast amount of digital content available, different search engines and search methods have been developed to locate and surface digital content. Despite the advancements of existing search functions, current search systems frequently exhibit technological limitations that give rise to several shortcomings, especially when it comes to offering an efficient and versatile search function for recalling previously displayed content.

As just suggested, some existing search systems are inefficient, both in terms of computing resources as well as client device navigation. As an example, many existing systems are restricted to searching within specific applications or platforms that are limited in their scope, only able to access content items expressly stored in certain databases. Such limitation means that client devices may have to navigate across multiple search engines, different computer applications, and/or different platforms to perform separate searches to search different content repositories, resulting in a fragmented, cumbersome, and inefficient search process. Indeed, running multiple separate computer applications for performing individual search functions consumes excessive computing resources that could otherwise be preserved with a more efficient system. Similarly, navigating across the various interfaces and applications requires an excessive number of client device interactions that could otherwise be reduced with a more efficient system.

In addition to their inefficiencies, some existing search systems are also inflexible and inaccurate. Indeed, many existing systems produce inaccurate search results that omit desired content items, especially in cases where search queries target previously displayed content that is not expressly captured and stored in a database accessible by a search engine. Indeed, the searching functionality available in existing search engines is often limited to searching among content items expressly generated by (or in response to a request of) a user account and stored in a database (e.g., locally or on a network). Because existing search systems are fixed to searching content that has been expressly generated and stored (e.g., via user account interaction with a client device), such existing systems fail to surface content not expressly generated and saved, even if the content was previously displayed on a client device.

These, along with additional problems and issues, exist with regard to existing systems.

SUMMARY

One or more embodiments described herein provide benefits and/or solve one or more problems in the art with systems, methods, and non-transitory computer readable storage media that capture snapshots of digital content displayed on a client device and facilitate searching through the captured content. Indeed, the disclosed systems provide a time-travel search function for identifying digital content previously displayed on a client device, even if the content was not expressly generated or stored by a user account. The disclosed systems provide options for capturing snapshots of content displayed on a display screen, extracting data from the snapshots, and storing the snapshots for use when populating search results. For instance, the disclosed systems utilize machine learning models to extract text and/or use a large language model to generate text versions of snapshots including extracted text, descriptions of images, transcripts of videos, and/or textual summaries from displayed documents or webpages. In response to a search query, the disclosed systems can produce search results that include digital videos including captured snapshots of content displayed by a client device over time.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
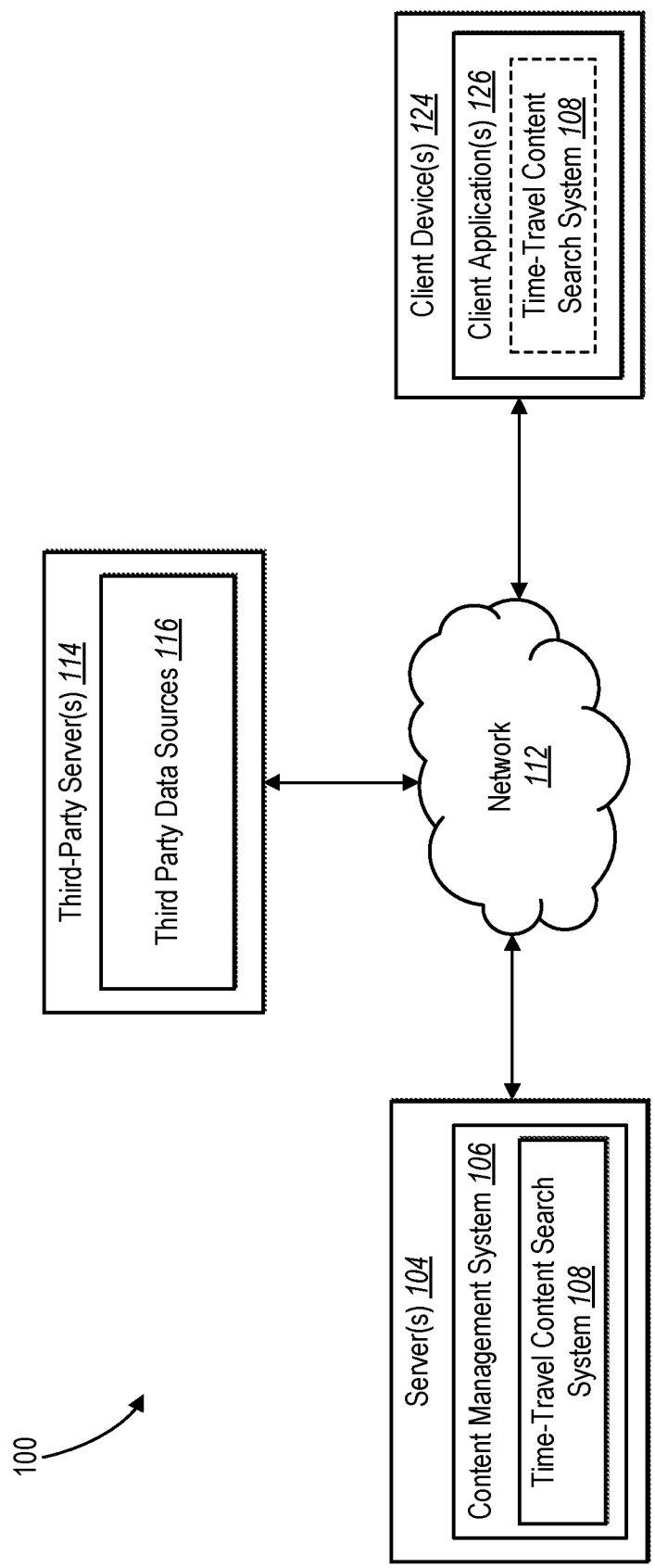
FIG. 1 illustrates an example environment within which a time-travel content search system can operate in accordance with one or more embodiments.

This disclosure describes embodiments of a time-travel content search system that captures snapshots of digital content displayed on a client device and facilitates searching through the captured content. In many scenarios, client devices (and/or server devices) execute or process search requests to scour large volumes of stored content items for surfacing search results. To enhance such search results, the time-travel content search system captures and provides snapshots of previously displayed digital content that may or may not be part of a discrete content item generated and stored by a user account, thus providing a way for search results to capture and surface content displayed over time. For instance, the time-travel content search system captures snapshots of content displayed on a display screen, extracts data from the snapshots, and generates digital videos from the snapshots to include as search results.

As just mentioned, in one or more embodiments, the time-travel content search system captures snapshots of a computer display screen and uses the captured snapshots to populate search results. For example, the time-travel content search system captures snapshots at configurable intervals (or regular intervals) and/or based on other factors (e.g., detecting changes in displayed content). Notably, the time-travel content search system can capture snapshots of the display screen without specifically integrating content capture application programming interfaces (APIs) from existing applications that the system may otherwise require for generating search results. The time-travel content search system can capture the snapshots from specific computer applications running on a client device and/or across multiple client devices as general screenshots of all content displayed on the client device at a time.

Further, in certain embodiments, the time-travel content search system extracts and stores data from the snapshots for use when populating search results. For example, the time-travel content search system can capture snapshots from a display screen and can assemble the captured snapshots into digital videos. In some cases, the time-travel content search system generates snapshot videos based on specific user data, a topic, a login session, an application session, a certain time period, and/or for a single login session where multiple applications are used. To illustrate, the time-travel content search system can use a machine learning model (e.g., a large language model) to extract and compare topics for application windows used in a single session to separate snapshots into separate videos by topic. As another example, the time-travel content search system can append snapshots into separate videos based on one or more application types.

In certain embodiments, for each digital video, the time-travel content search system extracts content from the individual snapshots to use as a basis for populating search results. In particular, the system uses machine learning models to extract text and/or uses a content conversion model to generate text versions of snapshots such as descriptions of images, transcripts of videos, and/or extracted text from displayed documents or webpages. In some cases, the system further uses a large language model to generate summaries from the text versions of the content items to use as the basis of a search. The system further stores application data for each snapshot, indicating the application and/or content item presented in each one so that, upon selection in a search result, the system can open the exact content item and/or application shown in the snapshot.

As mentioned, the time-travel content search system generates search results that incorporate information from snapshots related to a user search query. For example, in response to a search query (which can include text descriptions, timeframe parameters, and/or freeform natural language), the system produces search results that include extracted text from a snapshot, the captured snapshot, and/or a digital video that includes the snapshot. Indeed, the system identifies videos that include snapshots with content corresponding to the search query and can display a thumbnail preview that includes a view of the snapshot with the strongest confidence value matching the search query. The time-travel content search system also enables selecting, playing, and scrubbing of the videos, including beginning the play of the video at the location of, or just before, the snapshot with the highest confidence value. The system can also identify and mark timestamps for additional snapshots in a video that also correspond to the search query.

Embodiments of the time-travel content search system can provide many technological advantages and benefits over existing systems and methods. In particular, compared to the above-described problems that arise in existing systems, the time-travel content search system can improve flexibility, efficiency, and accuracy of these existing systems. Specifically, in one or more embodiments, the time-travel content search system can improve system flexibility when generating search results by performing time-travel searches through content displayed on a client device over time. Indeed, unlike some prior systems that are limited to searching content items expressly generated and stored by user accounts, the time-travel content search system can flexibly adapt to searching previously displayed content irrespective of express input to generate and save the displayed content. For example, the time-travel content search system does not require express input to save or store a content item within a database for the content to be searchable. Rather, the time-travel content search system automatically (e.g., without interaction to prompt) captures screenshots for appending together into digital videos which depict content displayed by a client device and which are searchable by a search engine.

Due at least in part to its improved flexibility, the time-travel content search system can further improve efficiency over prior systems. While some prior systems waste computing resources by running multiple search applications at a time (or opening and running them one after the other), the time-travel content search system can provide a more comprehensive search function within a single application. Indeed, the time-travel content search system captures snapshots of displayed content across various applications running on a client device over time and searches among the snapshots to generate search results. Indeed, the time-travel content search system generates search results from captured snapshots across various computer applications, login sessions, and/or client devices (e.g., where a user account logs in to multiple devices which each have their own snapshots that can combine to generate a video). By avoiding the need to run multiple search applications, the time-travel content search system preserves computing resources dedicated to executing search functions as compared to prior systems.

In addition to improved computational efficiency, the time-travel content search system provides improved navigationally efficiency as well. Specifically, in one or more embodiments, the time-travel content search system enhances navigational efficiency by providing search results without requiring client device interactions to navigate among many different computer applications to find the content. For example, the time-travel content search system can generate search results from snapshots captured across multiple applications and can provide the search results for display in a single interface, as opposed to prior systems that require navigation across multiple search interfaces or applications. In addition, the time-travel content search system can also provide search results that improve navigational efficiency by opening or accessing content items and/or applications directly from selected snapshots in a search result video (e.g., without requiring independently opening the computer application and navigating to the content).

As mentioned, the time-travel content search system provides improved accuracy as well. For example, the time-travel content search system generates more accurate search results by identifying content included within captured snapshots that would otherwise be missed by prior search systems. Indeed, prior systems search only content items that are expressly generated and stored in a database (locally or on the cloud), but they cannot search through other previously displayed content that was never expressly saved by a user account. The time-travel content search system, on the other hand, automatically stores snapshots to provide a more robust, more accurate search function than is available in prior systems for locating digital content previously displayed on a client device.

Along these lines, the time-travel content search system introduces an entirely new functionality not available in existing search systems. In particular, existing search systems do not possess the capability to generate and retain videos generated from snapshots of the graphical user interface, nor provide the ability to provide search results that include videos recordings associated with the snapshots. Furthermore, existing systems do not provide the ability to select, play, or scrub the snapshot videos provided in the search results.

As illustrated by the foregoing discussion, the present disclosure utilizes a variety of terms to describe features and benefits of the time-travel content search system. Additional detail is now provided regarding the meaning of these terms. In particular, as used herein the term "snapshot" refers to an image or representation of digital content displayed on a computer screen at a particular moment. For example, a snapshot could be a static portrayal of an application's state as it appears on the screen, taken at regular intervals or triggered by specific events like content changes or user-defined parameters. As another example, a snapshot can include a static portrayal of all content displayed on a client device across all visible applications shown at a particular moment. To illustrate, a snapshot can include a screen capture of content within documents, applications, chat sessions, emails, videos, slideshows, or various other computer applications.

In addition, as used herein, the term "digital video" (or "snapshot video" or "video") refers to a dynamic visual medium constructed by seamlessly combining multiple individual snapshots or frames in a chronological order. For example, a digital video includes a sequential and continuous representation of visual content created by seamlessly combining multiple individual snapshots or frames. These frames can be displayed in rapid succession, simulating the passage of time within the video, and producing a recreation of captured digital content over a time period from the computer screen.

As used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Moreover, as used herein, the term "login session" refers to a time period during which a user accesses a computing environment. For example, a login session begins when a user provides authentication credentials, such as a username and password, which the system verifies before granting the user privileges to use various applications and access data. For example, during a login session, a user may interact with multiple applications and data repositories (e.g., opening files or running programs) and navigate between applications that are viewed on a computer display (e.g., on a graphical user interface). The login session can be explicitly terminated by a user logout or can be implicitly terminated by a system timeout. Relatedly, as used herein, an "application session" refers to the duration of an interaction of a client device with a specific computer application. The application session commences when the client device initiates the application, remains active as long as the application is running, and ends when the client device exits the application. During an application session, the client device can engage with the application features, manipulate data, or perform tasks specific to the application.

Further, as used herein, the term "large language model" refers to a machine learning model trained to perform computer tasks to generate or identify content items in response to trigger events (e.g., user interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, summaries, or query responses) and/or to identify content items based on various contextual data, including graph information from a knowledge graph and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the morphing interface system utilizes a large language machine-learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Furthermore, as used herein, the term "content conversion model" refers to a model (e.g., a machine learning model or a neural network) or a collection of models for converting digital content from one format, type, or code structure to another. For example, the content conversion model can convert one type of content item to another type of content item. To illustrate further, the content conversion model can convert a visual text representation, a video, or a photograph to a text file or a file containing text descriptions of the video or photograph content. The content conversion model can include instructions for utilizing various application programming interfaces (APIs) to convert content items from one type to another, such as APIs to access a model for extracting data, APIs to access transcription models, etc. In some cases, a content conversion model includes or incorporates a compatibility graph to map the conversion process between content types. For example, a content conversion model can be a model as outlined in U.S. patent application Ser. No. 18/469,357, titled "GENERATING LARGE LANGUAGE MODEL OUTPUTS FROM STORED CONTENT ITEMS," filed 18 Sep. 2023, which is incorporated by reference in its entirety.

Additionally, as used herein, the term "topic extraction model" refers to a model (e.g., a machine learning model) or a collection of models for extracting a topic from digital content or text representations of digital content. For example, the topic extraction model can analyze and parse large volumes of text-based data to identify and extract topics that encapsulate themes or subjects discussed within the content.

Additional detail regarding the time-travel content search system will now be provided with reference to the figures. For example, FIG. 1 illustrates a schematic diagram of an exemplary system environment ("environment") 100 in which a time-travel content search system 108 can be implemented. An overview of the time-travel content search system 108 is described in relation to FIG. 1. Thereafter, a more detailed description of the components and the processes of the time-travel content search system 108 is provided in relation to the subsequent figures.

As shown, the environment includes third-party server(s) 114 and client device(s) 124. The client device(s) 124 can be one of a variety of computing devices, including a smartphone, a tablet, a smart television, a desktop computer, a laptop computer, a virtual reality device, an augmented reality device, or another computing device as described in relation to FIGS. 9-10. The client device(s) 124 can communicate with the server(s) 104 and or third-party server(s) 114 via the network 112. For example, the client device(s) 124 can receive user input from respective users interacting with the client device(s) 124 (e.g., via the content management system 106) to, for instance, access, or modify, and/or add or content for display (e.g., via the time-travel content search system 108). In addition, the client device(s) 124 can receive user input from respective users interacting with the client device(s) 124 (e.g., via the content management system 106) to, for instance, access or search content (e.g., via the time-travel content search system 108). In addition, the time-travel content search system 108 on the third-party server(s) 114 can receive information relating to various interactions with third-party content based on the input received by the client device(s) 124 (e.g., to generate application content for display).

As shown, the client device(s) 124 can include a client application(s) 126. In particular, the client application(s) 126 may be one or more native applications installed on the client device(s) 124 (e.g., a mobile application, a desktop application, etc.), or a cloud-based or web application where all or part of the functionality is performed by the third-party server(s) 114. Based on instructions from the content management system 106, the client device(s) 124 can present or display information, via the client application(s) 126, including graphical interfaces that include application content and/or search results. As shown, the time-travel content search system 108 can include implementations where all or part of the functionality for the time-travel content search system 108 is performed by the client application(s) 126.

As illustrated in FIG. 1, the example environment also includes the third-party server(s) 114. The third-party server(s) 114 may generate, track, store, process, receive, and transmit electronic data, such as application content, interactions with application content, and/or interactions between user accounts or client devices. For example, the third-party server(s) 114 may receive data from the client device(s) 124 in the form of a request to generate application content, interact with application content, or display/remove application content for a graphical system on the client device(s) 124. Indeed, the third-party server(s) 114 can communicate with the client device(s) 124 to send and/or receive data via the network 112. In some implementations, the third-party server(s) 114 comprise(s) a distributed server where the third-party server(s) 114 include(s) a number of server devices distributed across the network 112 and located in different physical locations. The third-party server(s) 114 can comprise one or more content servers, application servers, communication servers, web-hosting servers, machine learning servers, and other types of servers. The content management system 106 can communicate with the third-party server(s) 114 to perform various functions associated with the time-travel content search system 108 such as identifying and collecting third-party data for the application content and/or search results that include content from third party data sources 116. Indeed, the content management system 106 can include a network-based cloud storage system to manage, store, and maintain application content and related data across numerous user accounts.

As shown in FIG. 1, the third-party server(s) 114 can include third party data sources 116. In some embodiments, the time-travel content search system 108 and/or the content management system 106 access the third-party server(s) 114 to access and obtain information from third party data sources 116 such as digital content, search results, graphical interface data, and other information. In some embodiments, the time-travel content search system 108 and/or the content management system 106 access the client device(s) 124 to access and obtain information from third party data sources 116 such as digital content, search results, graphical interface data, and other information.

Although FIG. 1 depicts the time-travel content search system 108 located on the server(s) 104, in some implementations, the time-travel content search system 108 may be implemented by one or more components of the environment (e.g., located entirely or in part). For example, the time-travel content search system 108 may be implemented by the client device(s) 124, and/or the third-party server(s) 114. For example, the client device(s) 124 can download all or part of the time-travel content search system 108 for implementation independent of, or together with, the server(s) 104.

In some implementations, though not illustrated in FIG. 1, the environment may have a different arrangement of components and/or may have a different number or set of components altogether. For example, the client device(s) 124 may communicate directly with the time-travel content search system 108, bypassing the network 112. As another example, the environment may include multiple client devices, each associated with a different user account for managing digital documents.

Figure 2:
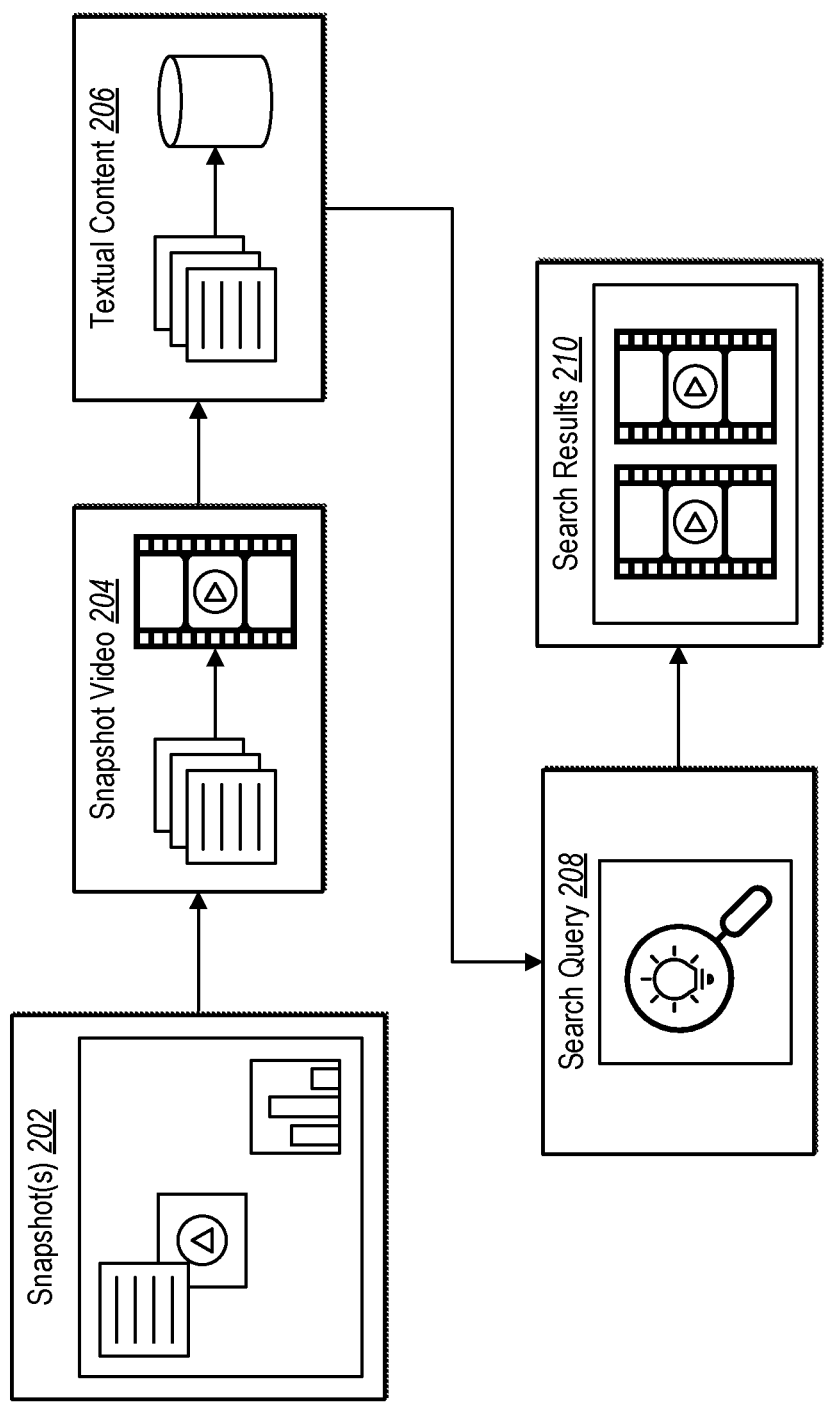
FIG. 2 illustrates an example overview of a time-travel content search system capturing a snapshot and providing search results in accordance with one or more embodiments.

As mentioned above, the time-travel content search system 108 can capture snapshots of digital content displayed on a client device and can surface search results based on the captured snapshots. FIG. 2 illustrates an overview of a time-travel content search system capturing a snapshot and providing search results in accordance with one or more embodiments. Additional detail regarding the various parts of FIG. 2 is provided thereafter with reference to subsequent figures.

As illustrated in FIG. 2, the time-travel content search system 108 captures a snapshot(s) 202 (e.g., screen capture) of digital content displayed on a client device. As shown, based on user input, the client device can display multiple applications on the display screen of a client device and the time-travel content search system 108 can capture a snapshot(s) 202 of the digital content displayed on the entire display screen or digital content displayed within windows of one or more applications on the display screen. For example, the time-travel content search system 108 can capture a static portrayal of one or more specific computer applications as shown on the display screen or capture a static portrayal of all content displayed on the display screen across all visible applications shown on the display screen at a particular moment. The time-travel content search system 108 can capture the digital content of the snapshot(s) 202 based on a system configuration value, at regular intervals, or as triggered by specific events (e.g., content changes or user-defined parameters).

As further shown, the time-travel content search system 108 can generate a digital video by combining (or appending) two or more of the snapshot(s) 202 into a snapshot video 204. For example, the time-travel content search system 108 can construct a snapshot video 204 from captured snapshots of the content displayed on the screen (e.g., one or more of the snapshot(s) 202) to create a snapshot video 204 which includes the captured snapshots in a chronological order of their capture. In this way, the time-travel content search system 108 can generate a digital video which includes a sequential and continuous representation of the visual content displayed on the display screen over a period of time or for a particular login session or application session. Furthermore, the time-travel content search system 108 can combine one or more of the snapshot(s) based upon specific criteria. For example, the time-travel content search system 108 generates the snapshot video based on specific user data, a topic, a login session, an application session, a certain time period, or for a single login session where multiple applications are used.

Furthermore, for the snapshot video 204, the time-travel content search system 108 can extract textual content 206 from the individual snapshots (e.g., snapshot(s) 202) to use as a basis for populating the search results 210. In particular, the time-travel content search system 108 can identify digital content within the snapshot(s) 202 and assign labels or identifiers to identify content within the snapshot(s) 202.

For example, the time-travel content search system 108 can use a content conversion model to generate the textual content 206 as a text-based representation of the snapshot(s) 202. The textual content 206 can include descriptions of images, transcripts of videos, or extracted text from displayed documents or webpages of the snapshot(s) 202. In addition, or in the alternative, the time-travel content search system 108 can utilize a large language model to generate summaries of the content of the snapshots to generate the textual content 206 to use a basis for the search. The time-travel content search system 108 can store the snapshot video 204 and the textual content 206 along with an association to the corresponding snapshot video 204.

In addition, the time-travel content search system 108 can accept or receive a search query 208 that defines content to surface from one or more captured videos (e.g., the snapshot video 204). In particular, the search query 208 can include a textual query to locate and surface relevant textual content 206 and an associated snapshot video 204 that contains one or more of a combination of words, keywords, phrases, time-periods, or expressions. In certain implementations, the search query can include a natural language query such as a query phrased as a full, conversational sentence expressing the desired search content or search result.

Based on analyzing the search query 208, the time-travel content search system 108 can generate the search results 210. In some cases, the time-travel content search system 108 populates the search results 210 by retrieving the textual content 206 and the corresponding snapshot video 204 (which contains one or more of the snapshot(s) 202). In particular, the time-travel content search system 108 can produce search results that include text extracted from the snapshot(s) 202 and/or the snapshot video 204. Indeed, the time-travel content search system 108 determines confidence scores for snapshot videos corresponding to the search query 208 (e.g., by performing a semantic comparison of the search query 208 and text-based representations of snapshot videos, such as the textual content 206). For instance, if the search query 208 includes terms corresponding to content depicted within the snapshot(s) 202, the time-travel content search system 108 surfaces the snapshot video 204 as part of the search results 210. The time-travel content search system 108 can also identify and mark (within the snapshot video 204 provided in the search results 210) timestamps for snapshots (e.g., the snapshot(s) 202) with the highest confidence values within the snapshot video 204 of corresponding to the search query 208.

Figure 3A:
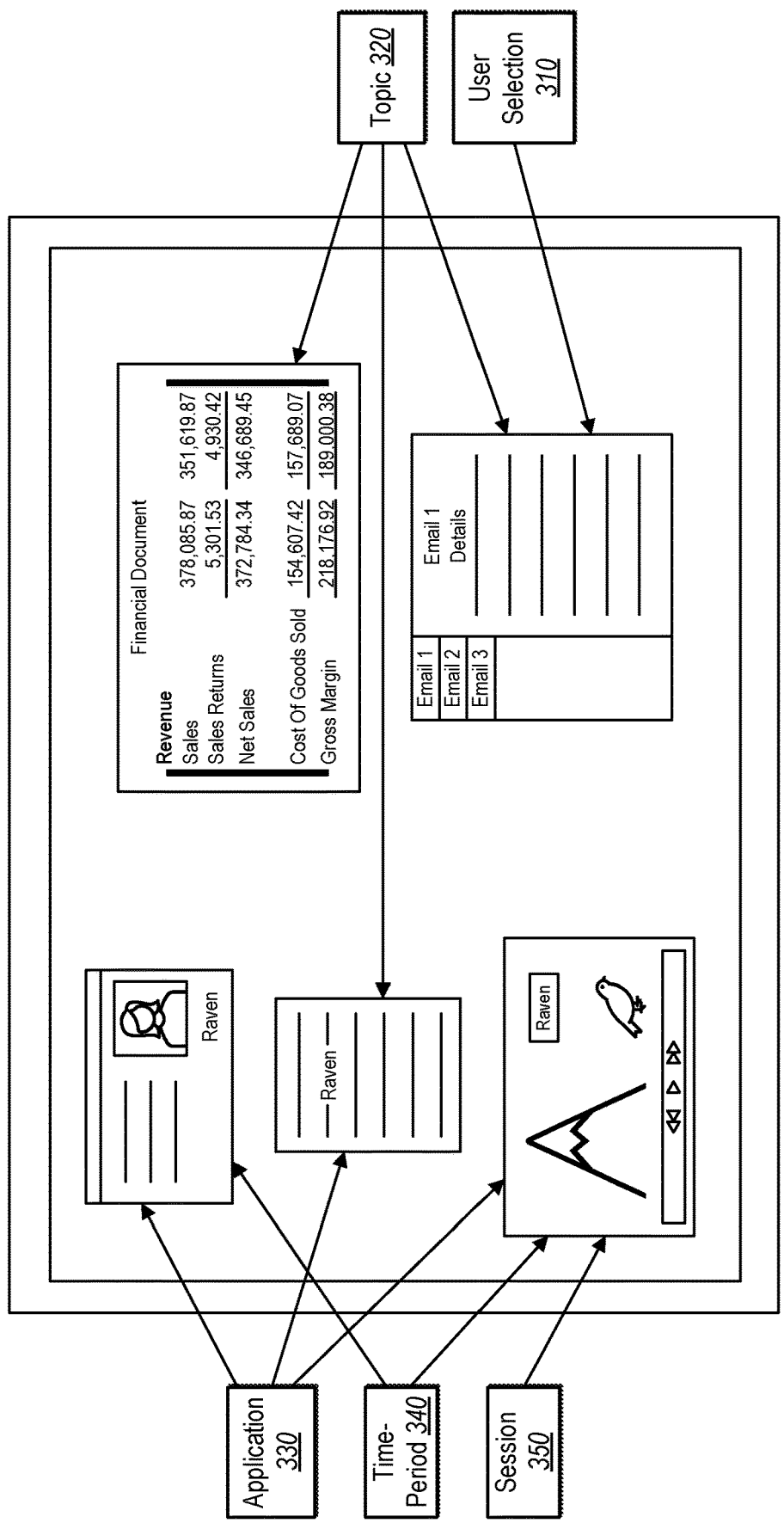
FIG. 3A-3B illustrate an example graphical interface for capturing snapshots in accordance with one or more embodiments.
Figure 3B:
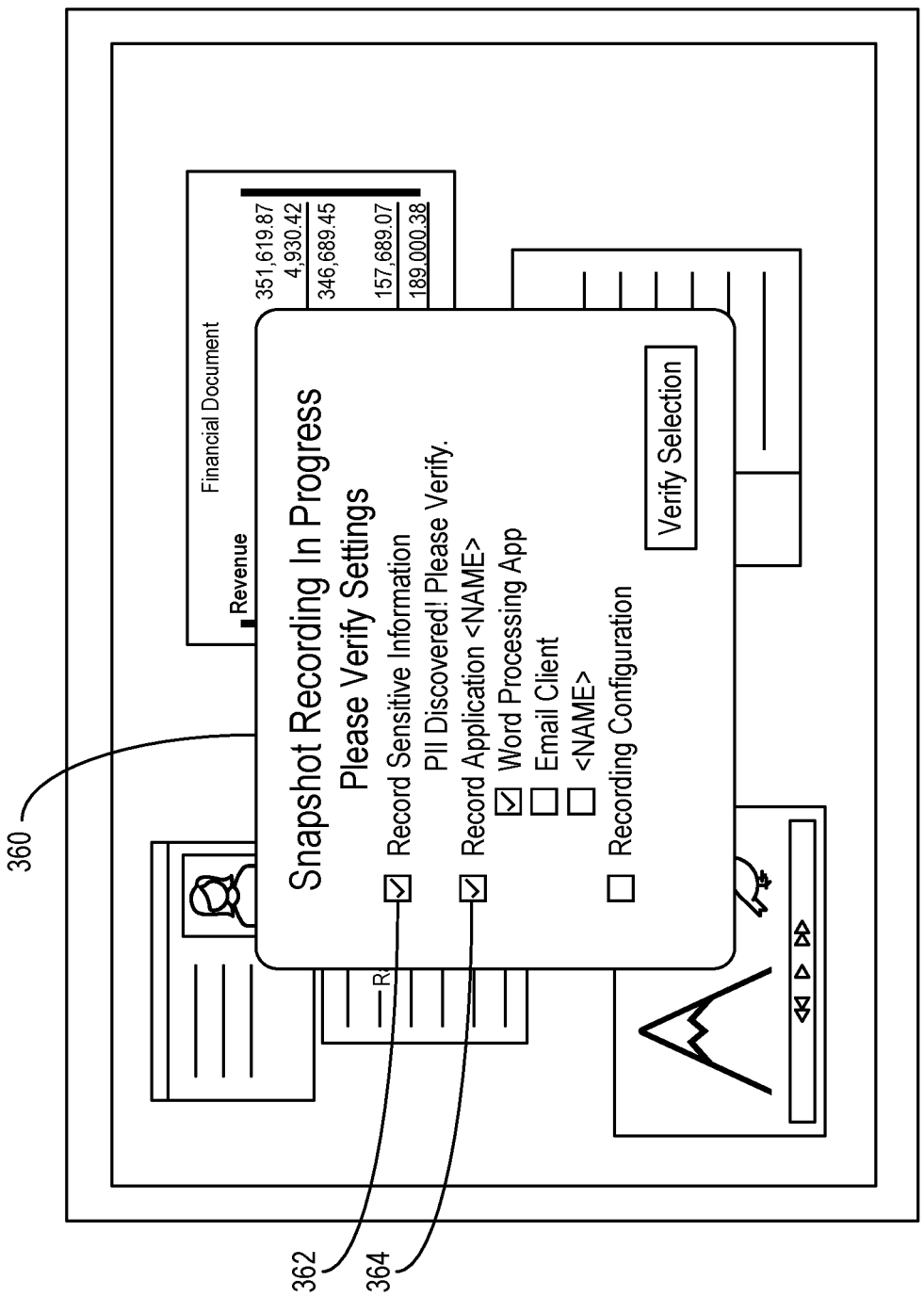

As mentioned, in one or more embodiments, the time-travel content search system 108 captures snapshots of a computer display screen displayed over time. FIGS. 3A-3B illustrate an example graphical interface (e.g., a computer desktop) for capturing snapshots utilizing the time-travel content search system in accordance with one or more embodiments.

As illustrated in FIG. 3A, the time-travel content search system 108 captures snapshots of a computer display screen based on various factors. As mentioned, the time-travel content search system 108 utilizes snapshots of the computer display and does not require express input to save or store a content item within a database to generate searchable content. For example, the time-travel content search system 108 captures snapshots at configurable intervals (e.g., regular intervals) and/or based on other factors (e.g., detecting changes in displayed content). In particular, the time-travel content search system 108 can capture snapshots based on a user selection 310, a topic 320, an application 330, a time-period 340, a session 350, and/or other factors.

Notably, the time-travel content search system can capture snapshots of the display screen independent of the displayed applications and without specifically integrating content capture APIs from the displayed applications and without retrieving application content from a data storage associated with the displayed applications. For example, the time-travel content search system 108 automatically (e.g., without interaction to prompt) captures snapshots (e.g., screenshots) for appending together into digital videos which depict content displayed by a client device and which are searchable by a search engine. Indeed, the time-travel content search system can capture the snapshots independent of other applications including capturing snapshots of the displayed computer applications running on a client device and/or across multiple client devices as snapshots of the content displayed on the client device(s) over time.

As shown, the time-travel content search system 108 can capture snapshots related to the user selection 310. For example, the time-travel content search system 108 can capture snapshots based on the user selection 310 which can indicate specific applications selected through configuration values or user preferences (e.g., as shown by the selection of an email application in FIG. 3A). Additionally, the time-travel content search system 108 can capture snapshots based on the user selection 310 which indicates enabling or disabling the snapshot capture of selected applications. As another example of user selection 310, the time-travel content search system 108 can begin capturing snapshots in response to client device input initializing snapshot capture (e.g., a "start" button) and can stop capturing screenshots in response to client device input terminating screenshot capture (e.g., a "stop" button).

As shown in FIG. 3A, the time-travel content search system 108 can be configured to capture snapshots of applications based on the type or category of the displayed content. In particular, the time-travel content search system 108 can capture snapshots based on a section of the option for the topic 320. The time-travel content search system 108 can categorize text and content items in snapshots to identify similar topics or themes. For example, the time-travel content search system 108 can utilize natural language processing techniques to identify and capture snapshots that contain related content or subjects based on their relevance or similarities and capture the snapshots based on the related content or subjects. To illustrate, as shown in FIG. 3A, the time-travel content search system 108 can capture snapshots associated with the topic 320 which indicates types, subjects, categories, formats, filetypes, or labels of displayed content, including business records, financial documents, emails, text documents, videos, images, and/or content relating to shared topics.

Relatedly, the time-travel content search system 108 can capture snapshots based on a selection of the option for the application 330. For example, the time-travel content search system 108 can capture snapshots based on the selection of one or more applications or the selection of one or more application types. The time-travel content search system 108 can thus capture screenshots of displayed content throughout the use of a particular application and/or across multiple applications relating to a shared application type or a shared purpose/goal (e.g., applications relating to project X or applications relating to generating a quarterly report). As shown in FIG. 3A, the time-travel content search system 108 can capture snapshots based on the selection of the applications including a web browser, a word processing application, and a multimedia player that each relate to a search for a content related to a research project based on "Raven."

As also shown, the time-travel content search system 108 can capture snapshots related to a specific time-period 340. In particular, the time-travel content search system 108 can capture snapshots based on a selection of the time-period 340. To illustrate, the time-travel content search system 108 can capture snapshots (including screenshots of one or more applications) over a specified period of time with a defined starting point and defined ending point. For instance, the time-travel content search system 108 can receive user interaction indicating a start time and an end time for a snapshot capture (such as an interaction with a "start" button and a "stop" button).

Relatedly, the time-travel content search system 108 can capture snapshots based on a selection of a session 350. To illustrate, based on the session 350, the time-travel content search system 108 can capture digital content displayed by one or more applications over a login session and/or within a particular application of an application session. For example, based on the session 350, the time-travel content search system 108 can capture all content on the computer display over a login session during which time the client device may interact with content presented via multiple applications and may navigate between the multiple applications on the computer display. As another example, based on the session 350, the time-travel content search system 108 can capture content on the computer display related to an application session during which time the client device may interact with or access content via a particular application.

As mentioned, the time-travel content search system 108 provides a versatile system for snapshot recording, offering client devices the flexibility to record snapshots based on user defined preferences or additional considerations. As illustrated in FIG. 3B, the time-travel content search system 108 can provide an option to verify a snapshot capture or to configure the snapshot recording settings.

As shown in FIG. 3B, the time-travel content search system 108 can include the indication 360 to select and capture snapshots based on a client device interaction. In one or more implementations, the time-travel content search system 108 can provide the indication 360 to set the controls for recording snapshots at the client device or the administrator device level based upon a client device selection or a client device interaction. For example, upon the detection of a client device initializing a screenshot capturing application, the time-travel content search system 108 can provide the indication 360 to configure functionality of the time-travel content search system 108. In one or more implementations, the time-travel content search system 108 can detect the initiation of a login/application session by a client device and can provide the indication 360 to set the controls for recording snapshots at the client device or the administrator device level based upon the detection of the initiation of the login/application session (and/or upon initializing a screenshot capturing application). In one or more implementations, the time-travel content search system 108 can provide the indication 360 based on the analysis of content within captured snapshots.

For example, the time-travel content search system 108 can detect, from the digital content within the captured snapshots, sensitive information (e.g., personally identifiable information (PII), PHI, financial information, personal photos, etc.) that is displayed on a client device. Furthermore, the time-travel content search system 108 can provide the indication 360 which includes a privacy controls option 362 to enable/disable the snapshot capture of the sensitive information. To illustrate, the time-travel content search system 108 can utilize a content conversion model (e.g., the content conversion model 504) and/or a topic extraction model (e.g., topic extraction model 508) to detect sensitive information within the snapshot. For instance, the time-travel content search system 108 can generate a sensitive information prediction score that indicates a probability that captured content includes sensitive (e.g., using a model trained to detect PII based on sample content items that include and/or do not include PII).

Based on detecting the sensitive information, the time-travel content search system 108 presents the indication 360 which includes the privacy controls option 362 and identifies the discovery and/or type of sensitive information on the computer display. Furthermore, the time-travel content search system 108 disables (or enables) the collection of sensitive information based on an indication, or instruction, to disable (or enable) the capture of additional snapshots depicting the sensitive information based on a user selection of the privacy controls option 362. For example, the time-travel content search system 108 can discontinue capturing snapshots until capture is re-enabled via a client device interaction. As another example, the time-travel content search system 108 can continue capturing snapshots but only in applications or windows that do not include sensitive information (e.g., whose content is below a sensitive information prediction score threshold).

As also shown, the time-travel content search system 108 can include the record application option 364 to enable/disable recording the content displayed by specific applications. In certain implementations, the time-travel content search system 108 can detect the display of an unknown, or previously unconfigured/uncategorized, application (e.g., <NAME>) and provide the indication 360. Furthermore, the time-travel content search system 108 can provide the record application option 364 to set the controls for recording snapshots at the client device or the administrator device level based upon the detection of the unknown application. Upon selection of an option to record for a particular application, the time-travel content search system 108 captures screenshots for the application while omitting screenshots (or refraining from capturing screenshots) from other unselected applications.

Figure 4:
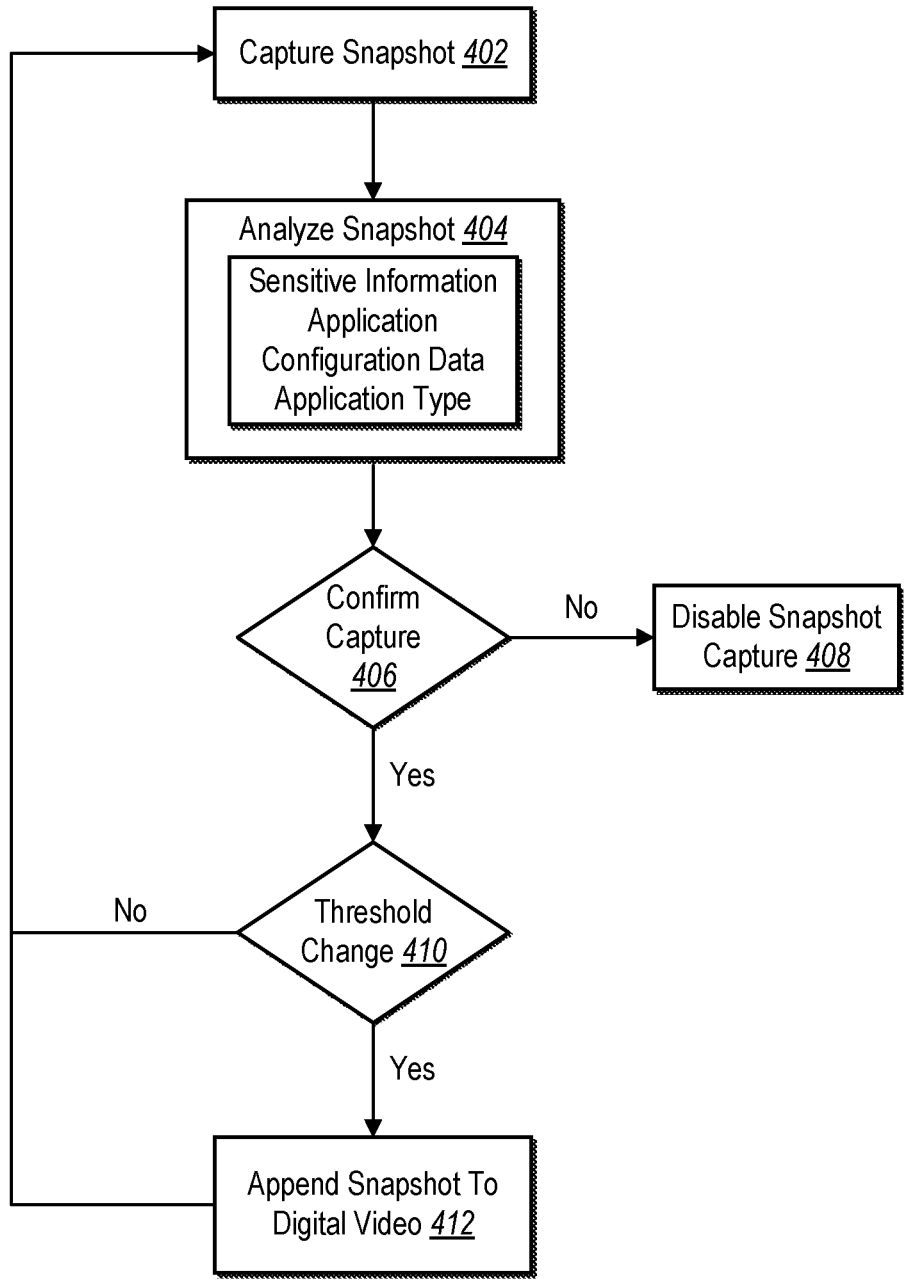
FIG. 4 illustrates an example flowchart of processes executed to generate a digital video from snapshots in accordance with one or more embodiments.

As mentioned, the time-travel content search system 108 can generate a snapshot video from captured snapshots. FIG. 4 illustrates a flowchart of processes to generate a digital video from snapshots in accordance with one or more embodiments.

As shown in FIG. 4, the time-travel content search system 108 can perform an act 402 to capture a snapshot. Indeed, as mentioned, the time-travel content search system 108 can capture a snapshot that includes content displayed by a computer display screen (e.g., within a computer application). The time-travel content search system 108 can capture snapshots at configurable intervals, based on changes in displayed content, and/or based on configuration values. The time-travel content search system 108 can capture snapshots of content depicted within a first application running on the client device, content depicted within a second application running on the client device, and/or content depicted within a combination of multiple applications running on the client device. As an example, the time-travel content search system 108 can capture a first snapshot of initial digital content displayed by the computer display screen (within a computer application) and can capture a second screenshot of content displayed in a different computer application.

Furthermore, the time-travel content search system 108 can detect a change from the initial digital content to new digital content that satisfies at least a threshold change. Based on detecting the threshold change from the initial digital content to new digital content, the time-travel content search system 108 can perform the act 402 to capture the snapshot. In particular, the time-travel content search system 108 can compare pixels (e.g., a pixel-by-pixel analysis) within captured snapshots to detect a threshold change. In certain embodiments, the time-travel content search system 108 utilizes a dissimilarity score to provide a numerical representation of the significance of the threshold change (e.g., based on a dissimilarity between the pixels of the snapshots). For instance, based on a high dissimilarity score, the time-travel content search system 108 determines the dissimilarity between the pixels meets a minimum threshold and the time-travel content search system 108 performs the act 402 to capture the snapshot.

Furthermore, the time-travel content search system 108 can perform an act 404 to analyze snapshot content. For example, the time-travel content search system 108 can analyze the snapshot to determine if the snapshot content contains sensitive information, the snapshot contains data from a particular application, the snapshot contains data from a particular application type, the snapshot contains data from a particular time period, the snapshot contains data from a particular session, the snapshot contains data related to specific content, the system has sufficient storage space to record the snapshot, and/or other factors. For example, the time-travel content search system 108 can determine if the snapshot is associated with a computer application of a specific application type designated as impermissible for capturing snapshots. as Additional detail regarding the analysis of screenshots is further discussed in relation to FIG. 5.

As also shown, the time-travel content search system 108 can perform an act 406 to confirm whether to capture the snapshot of the associated computer display screen and/or computer application. In particular, the time-travel content search system 108 can determine if the snapshot capture satisfies the snapshot configuration requirements set by a client device or an administrator device for capturing snapshots. In addition, the time-travel content search system 108 can prompt the user (e.g., as discussed in relation to FIG. 3B) to determine whether to capture the snapshot.

As mentioned, the time-travel content search system 108 can utilize configuration requirements based on a variety of factors including client device selection, content type, sensitive information detection, application, time-period, and/or session to determine whether to capture the snapshots. For example, based on determining that the snapshot is associated with a specific content type designated as impermissible for capturing snapshots, is a specific application type designated as impermissible for capturing snapshots, is a specific time-period designated as impermissible for capturing snapshots, and/or is a specific session designated as impermissible for capturing snapshots the time-travel content search system 108 can exclude the digital content accessed via the computer application as part of capturing the snapshots. To illustrate, the time-travel content search system 108 can determine that a specific application type among a variety of computer application types is designated as impermissible for capturing snapshots. Based on this determination, the time-travel content search system 108 can exclude the digital content accessed via the specific application type (and displayed on the computer display) as part of capturing the snapshots applications on the computer display.

As shown, the time-travel content search system 108 can determine to perform an act 408 to disable the capture of snapshots based on the act 406. For example, if the time-travel content search system 108 determines that the captured snapshot does not satisfy the configuration requirements, the time-travel content search system 108 can perform the act 408 to disable the capture of snapshots. In addition, if the time-travel content search system 108 receives a user selection to disable snapshot capture (e.g., for one or more applications, topics, or content types), the time-travel content search system 108 can perform the act 408 to disable the capture of snapshots. In one or more implementations, the time-travel content search system 108 can re-enable the capture of snapshots based on a configuration requirement, a user selection, an amount of time, a session, or other factors.

Furthermore, the time-travel content search system 108 can determine to continue capturing snapshots based on the act 406. In addition, as shown in FIG. 4, the time-travel content search system 108 can perform an act to determine if the captured snapshot varies from a previously captured snapshot by a threshold change 410 (e.g., a threshold amount in content appearance). For example, the time-travel content search system 108 can compare the pixels of the snapshot to the pixels of a previous snapshot to determine if the snapshots satisfy a dissimilarity threshold. To illustrate, the time-travel content search system 108 can generate composite pixel values for snapshots to compare with one another, or the time-travel content search system 108 can compare pixel values in corresponding pixel coordinate locations of snapshots in a pixel-by-pixel analysis. The time-travel content search system 108 can utilize a defined dissimilarity threshold to determine if the changes between the snapshots are significant and, if the differences in pixel data exceed the dissimilarity threshold, the time-travel content search system 108 determines the snapshots are distinctly different. Based on determining that the snapshots do not satisfy a dissimilarity threshold, the time-travel content search system 108 can discard the snapshot and perform the act 402 to capture the next snapshot. Alternatively, based on determining that the snapshots satisfy a dissimilarity threshold, the time-travel content search system 108 can continue to perform act 412 to append the snapshot to a digital video.

As further shown, the time-travel content search system 108 can perform an act 412 to append the snapshot to a digital video. In particular, the time-travel content search system 108 can automatically (e.g., without client device interaction to prompt) append one or more snapshots together to create digital videos. In some cases, the time-travel content search system 108 appends the snapshots to generate one or more digital videos based on topics, specific user data, a login session, an application session, a certain time-period, or for a single login session where multiple applications are used.

In certain embodiments, the time-travel content search system 108 can save the snapshot or information regarding the snapshot based on the threshold change 410. To illustrate, the time-travel content search system 108 can save the snapshot as a digital image based on the threshold change 410. For example, the time-travel content search system 108 can automatically (e.g., without client device interaction to prompt) save the one or more snapshots as a digital image. Furthermore, the time-travel content search system 108 can save textual information related to the snapshot based on the threshold change 410. For example, the time-travel content search system 108 can automatically (e.g., without client device interaction to prompt) save text displayed within the snapshot, a summary of content within the snapshot, or a reference to content within the snapshot (e.g., a URL or timestamp).

Figure 5:
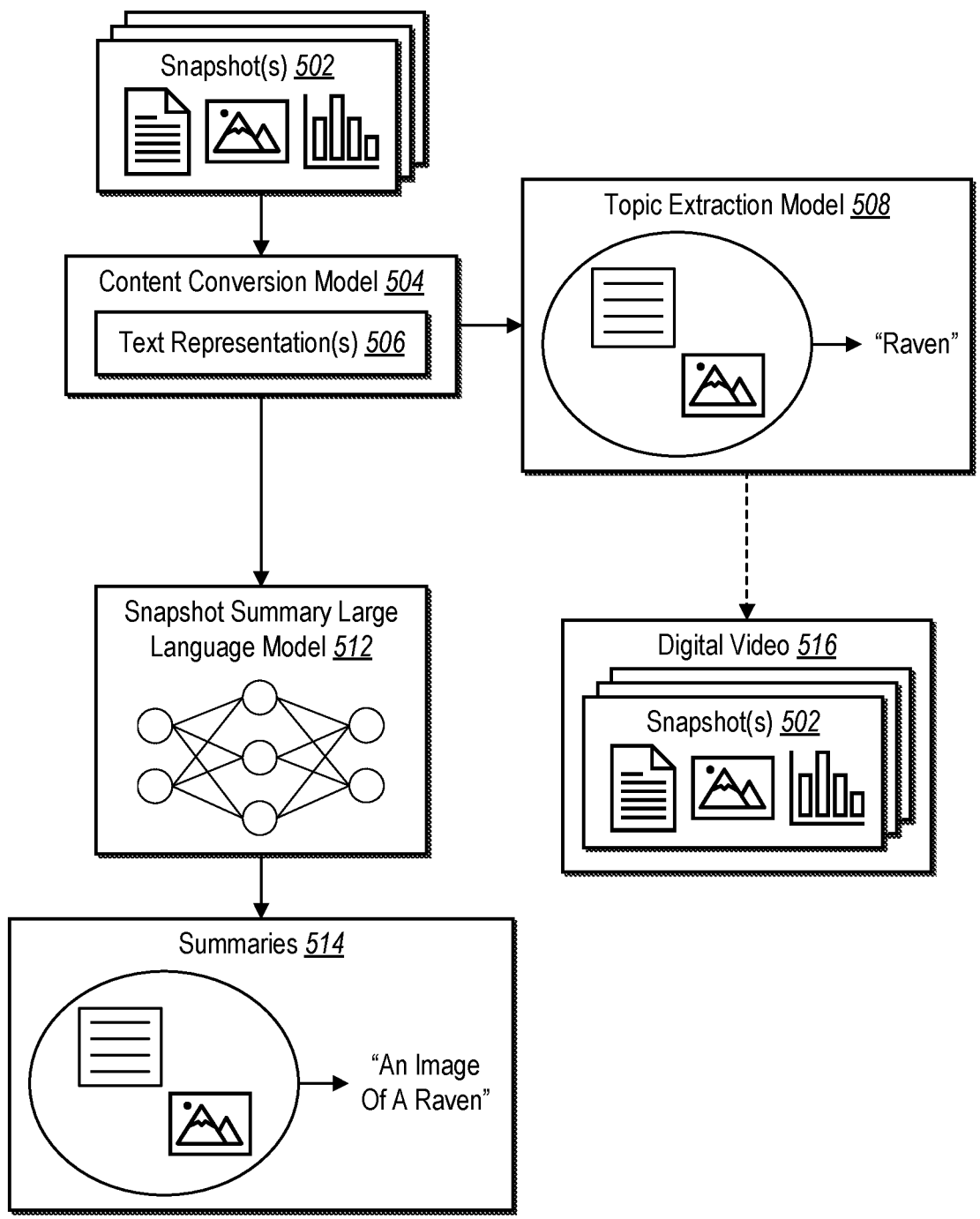
FIG. 5 illustrates an example of utilizing a content conversion model, a topic extraction model, and a large language model to generate topic and summary data for snapshots in accordance with one or more embodiments.

To illustrate, the time-travel content search system can use a machine learning model and/or a large language model to extract and compare topics for application windows used in a single session to separate snapshots into separate videos by topic as further described in relation to FIG. 5. As another example, the time-travel content search system 108 can append the snapshots of content to a digital video based on user interests, settings, and/or behavior to create personalized digital video summaries based on specified user interactions. As an example, the time-travel content search system 108 can generate a digital video by appending snapshots of displayed activity during a login session which can be used as an audit trail, providing a visual record of login activities for security compliance requirements. Furthermore, the time-travel content search system 108 can generate a can generate a digital video by appending snapshots of an application session to map progress within the application at various stages of development for training purposes or to review the workflow for efficiency improvements. As another example, the time-travel content search system 108 can append snapshots to a digital video at regular intervals to highlight usage patterns or provide insights into peak activity times or content update frequency. As another example, the time-travel content search system 108, can append snapshots of multiple applications during a single login session to create a comprehensive digital video encompassing cross-application interactions. As another example, the time-travel content search system 108 can append snapshots based on an application type including the applications of documents, spreadsheets, and presentations to facilitate project management tasks.

As mentioned, the time-travel content search system 108 can extract topics and/or generate summaries of captured snapshots as a basis for populating search results. FIG. 5 illustrates an example of utilizing a content conversion model, a topic extraction model, and a large language model to generate topic and summary data for snapshots in accordance with one or more embodiments.

As illustrated in FIG. 5, and as previously discussed, the time-travel content search system 108 can capture one or more snapshot(s) 502 from a display screen. Furthermore, the time-travel content search system 108 can utilize a content conversion model 504 to generate a text representation(s) 506 of the snapshot(s) 502. For instance, the time-travel content search system 108 can utilize a content conversion model 504 to generate the text representation(s) 506 of one or more snapshot(s) 502 by converting the content of the snapshot(s) 502 from their initial, native format to a text format. For example, the time-travel content search system 108 can utilize the content conversion model 504 to generate a set of text characters that describe visual content of the snapshot(s) 502. The content conversion model 504 can include instructions for utilizing various application programming interfaces (APIs) to convert content items from one type to another, such as APIs to access a model for extracting data, APIs to access transcription models, etc. By doing so, the time-travel content search system 108 can generate the text representation(s) 506 of the snapshot(s) 502, regardless of the source of the snapshot(s) 502 (such as screenshots of emails, business records, financial documents, or multimedia like videos and images). Indeed, the time-travel content search system 108 can generate textual content (e.g., the text representation(s) 506) that describes content visually depicted within one or more of the snapshot(s) 502 and can utilize the textual content to generate search results by searching the textual content for content corresponding to the search query.

As further shown in FIG. 5, the time-travel content search system 108 can utilize a topic extraction model 508 to generate topics associated with the snapshot(s) 502. For example, the time-travel content search system 108 can generate and store topics associated with the snapshot(s) 502 which can include one or more topics associated with the text representation(s) 506. For example, the topic extraction model 508 can analyze and parse large volumes of text-based data to identify and extract topics that encapsulate themes or subjects discussed within the content. To illustrate, the text representation(s) 506 of the snapshot(s) 502 can have large amounts of text (e.g., thousands, tens of thousands, or millions of characters) and the time-travel content search system 108 can extract topics from the text representation(s) 506 to store for comparing with search queries. Indeed, the topic extraction model 508 can generate topics for a search query and can compare the query topic with one or more snapshot topics to produce search results.

The time-travel content search system 108 can compare topics of the snapshot(s) 502. to separate the snapshot(s) into separate digital videos by topic to create the digital video 516. The time-travel content search system 108 can compare topics from the snapshot(s) 502 captured in a login session, application session, or multiple application sessions. In particular, the time-travel content search system 108 can employ advanced natural language processing (NLP) techniques to analyze the text within the snapshot(s) 502. The time-travel content search system 108 can parse the text representation(s) 506 and extract key information such as topics, keywords, sentiment, and semantic relationships to discern subject matter within the snapshot(s) 502. To illustrate, if the topic extraction model 508 determines a topic related to an environmental study, the time-travel content search system 108 can append the snapshot(s) 502 of all relevant emails, text documents, videos, images, and other digital content related to the environmental study to generate the digital video 516. Notably, the time-travel content search system 108 can generate the digital video 516 by appending snapshots with shared topics together and/or by appending snapshots from shared applications (or across different applications) that have shared topics. Furthermore, the time-travel content search system 108 can extract, utilizing the topic extraction model 508, topics associated with the snapshot(s) 502 and utilize the topics to generate search results based on a threshold similarity between the topics.

As further shown in FIG. 5, the time-travel content search system 108 can provide the text representation(s) 506 to a snapshot summary large language model 512. Specifically, the topic extraction model 508 can provide the text representation(s) 506 along with a model output request to analyze, understand, and generate summaries for the snapshot(s) 502. In turn, the snapshot summary large language model 512 can generate summaries 514 which summarize and represent the digital content of the snapshot(s) 502 in a concise format. In some embodiments, the time-travel content search system 108 thus generates the summaries 514 in the form of a summary of one or more portions of the snapshot(s) 502. Furthermore, the time-travel content search system 108 can utilize the summaries 514 as a basis for a search associated with the digital videos containing the snapshot(s) 502 (e.g., to compare search queries with summary text).

As also shown in FIG. 5, in certain implementations, the time-travel content search system 108 can generate a digital video 516 by appending the snapshot(s) 502 together. For example, the time-travel content search system 108 generates the digital video 516 by appending snapshot that share topic(s) and/or based on comparing text representation(s) 506 of snapshots, and/or based on comparing summaries 514 of snapshots). As mentioned, the time-travel content search system 108 assembles the digital video 516 based on various factors including the topical content of the snapshot(s) 502. As shown, the time-travel content search system 108 can determine that the content of the snapshot(s) 502 as represented by the topic(s) are sufficiently related to be included within the same digital video (e.g., by determining distances or cosine similarities between snapshot-specific topic embeddings in an embedding space). Based on this determination, the time-travel content search system 108 can append the snapshot(s) 502 to the digital video 516. Furthermore, the time-travel content search system 108 can store the snapshot and digital video for use when populating the search results.

As further illustrated in FIG. 5, as part of the process for analyzing the snapshot(s) 502, the time-travel content search system 108 can extract embedding(s) from the text representation(s) 506, to represent extracted topics, and/or from the summaries 514. The time-travel content search system 108 can generate one or more embedding(s) for each of the text representation(s) 506 based on the content of the snapshot(s) 502. Furthermore, the time-travel content search system 108 can similarly extract embeddings from the summaries 514. The time-travel content search system 108 can generate one or more summary embeddings for each of the summaries 514 based on summarized content of the snapshot(s) 502. In some cases, the topic extraction model 508 can extract text embedding(s) from the text representation(s) 506 and/or summary embeddings from the summaries 514. In turn, the time-travel content search system 108 can associate the text embedding(s) and the summary embeddings with the digital video 516.

In certain implementations, the time-travel content search system 108 utilizes embeddings to populate the search results. For example, the time-travel content search system 108 can generate query embeddings from the search query text. The time-travel content search system 108 compares the query embeddings with text embedding(s), topic embeddings, and/or summary embeddings using a measure of distance or similarity to determine similarity scores (e.g., a cosine similarity) in an embedding space. The time-travel content search system 108 can ranks the embedding(s) and based on the similarity scores. In particular, the time-travel content search system 108 utilizes a high similarity score between the query embedding and a text embedding (or a summary embedding or a topic embedding) to represent a relevant digital video 516 associated with the search query when populating the search results. In contrast, the time-travel content search system 108 utilizes a low similarity score between the query embedding and another embedding and/or to represent a non-relevant digital video associated with the search query when populating the search results.

Figure 6:
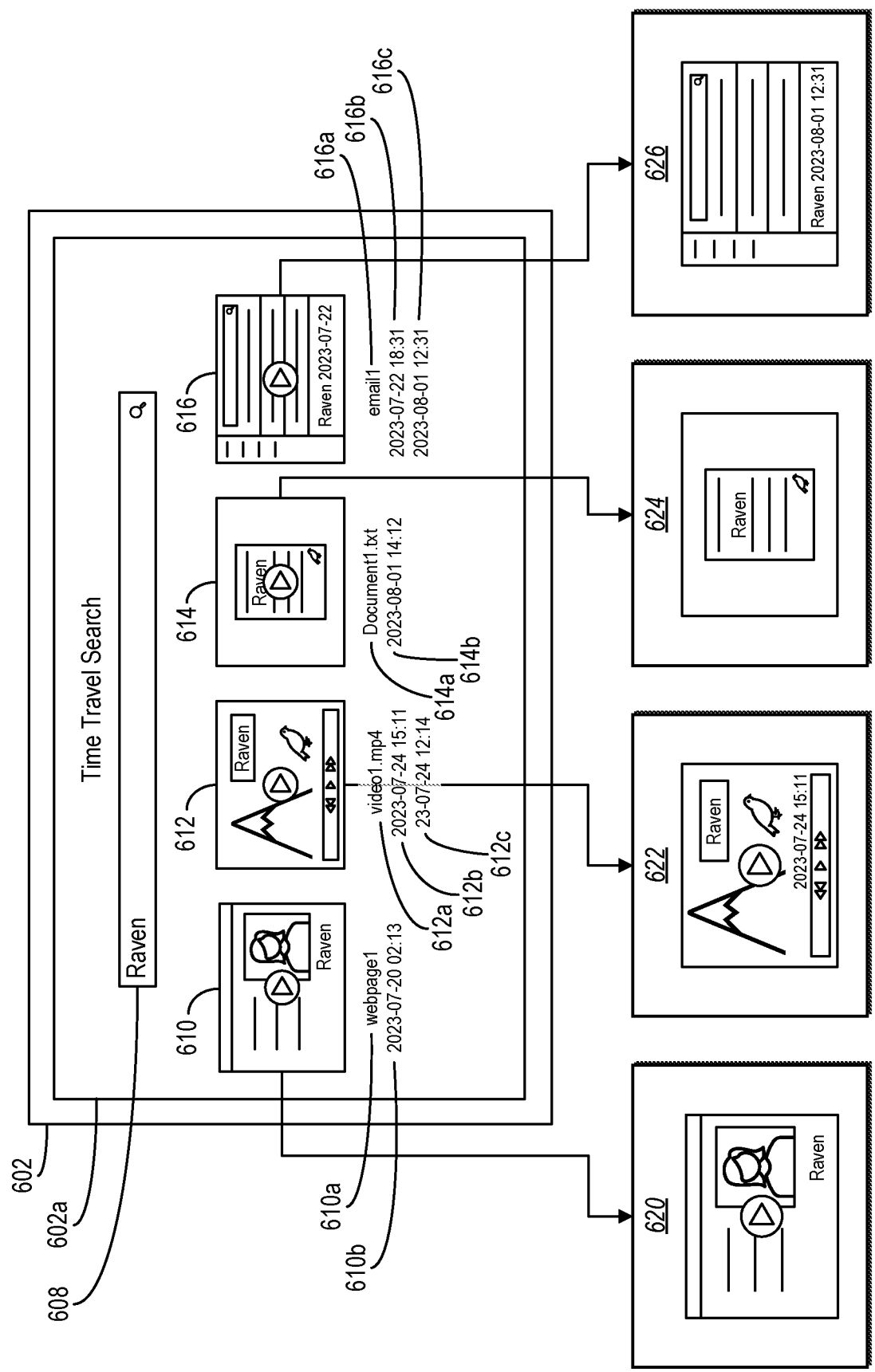
FIG. 6 illustrates examples of the time-travel content search system generating search results in accordance with one or more embodiments.

As mentioned, the time-travel content search system 108 can populate search results that include data from captured snapshots. FIG. 6 illustrates examples of generating search results in accordance with one or more embodiments.

As illustrated in FIG. 6, the time-travel content search system 108 provides a user interface 602*a* for display on a client device 602. Within the user interface 602*a*, the time-travel content search system 108 populates search results based on a search query 608. The search query 608 can include text, text descriptions, timeframe parameters, and/or freeform natural language for example, as shown in FIG. 6, the search query 608 contains the text "Raven." As shown, the time-travel content search system 108 provides search results that include a video thumbnail 610, a video thumbnail 612, a video thumbnail 614, and a video thumbnail 616 that contain digital content relating to the search query 608, but in different ways. As shown, each of the video thumbnail 610, the video thumbnail 612, the video thumbnail 614, and the video thumbnail 616 all contain a reference, text or content item relating to the search query 608 (e.g., the text "Raven"). In particular, the video thumbnail 610 portrays a digital video including snapshots of a web browser application with text "Raven," the video thumbnail 612 portrays a digital video including snapshots of a video application with text "Raven" and an image of a raven, the video thumbnail 614 portrays a digital video including snapshots of a word processing application with text "Raven" and an image of a raven, and the video thumbnail 616 portrays a digital video including snapshots of an email application with text "Raven." The time-travel content search system 108 can produce search results that include extracted text from a snapshot, the captured snapshot itself, a digital video that includes the snapshot, and/or timestamp information.

Indeed, as mentioned, the time-travel content search system 108 can generate textual content associated with one or more captured snapshots (e.g., as described in relation to FIG. 5) and can utilize the textual content to generate search results by searching the textual content for content corresponding to the search query. Furthermore, the time-travel content search system 108 can extract content (e.g., utilizing a content conversion model), topics (e.g., utilizing a topic extraction model), and/or summaries (e.g., utilizing a snapshot summary large language model) associated with captured snapshots and utilize the content, topics, and/or summaries to generate search results based on a threshold similarity between the topics and/or summaries. Specifically, the time-travel content search system 108 can compare snapshot data (e.g., extracted text, topics, or summaries) with query data to populate search results.

As shown, the time-travel content search system 108 generates search results including the video thumbnail 610 representing a digital video 620 containing assembled snapshots (e.g., a first snapshot, a second snapshot, a third snapshot, etc.) of a web browser application. As shown, the time-travel content search system 108 provides the video thumbnail 610 with title 610a (e.g., webpage1) positioned at timestamp 610b (e.g., 2023-07-20 02:13) to reflect a particular snapshot. To illustrate, as shown, the video thumbnail 610 displays the portion of the digital video 620 where the word "Raven" is displayed on the screen which matches the location associated with the search query 608. Furthermore, as shown, based on a client device interaction selecting the video thumbnail 610 (and/or timestamp 610b), the time-travel content search system 108 opens the digital video 620 at the location of the timestamp 610b within a video window for scrubbing and playing the digital video 620. In one or more implementations, based on a selection of digital content within the video thumbnail and/or within the digital video 620, the time-travel content search system 108 opens an associated computer application (e.g., a web browser application associated with the recorded snapshot) to the location of the digital content shown at the timestamp 610b (e.g., to match a location indicated by the search query 608).

As also shown, the time-travel content search system 108 generates search results including the video thumbnail 612 representing a digital video 622 containing assembled snapshots of a video application. As shown, the time-travel content search system 108 provides the video thumbnail 612 with title 612a (e.g., video.mp4) positioned at timestamp 612b (e.g., 2023-07-24 15:11). As also shown, the time-travel content search system 108 includes an alternative link to a timestamp 612c (e.g., 2023-07-24 12:14) that corresponds to another location (e.g., a second snapshot) within the video thumbnail 612 associated with results for the search query 608.

In certain implementations, the time-travel content search system 108 displays the content of the digital video 622 at the timestamp 612b that provides the best match within the video thumbnail 612 for the location of results for the search query 608 as the thumbnail view for the video thumbnail 612. For example, as shown, the video thumbnail 612 displays a portion of the video corresponding to a first snapshot (e.g., the snapshot associated with timestamp 612b) according to a ranking of the first snapshot in relation to a second snapshot (e.g., the snapshot associated with timestamp 612c) based on the relevance to the query content.

Furthermore, as shown, based on a client device interaction with the video thumbnail 612 (or timestamp 612b), the time-travel content search system 108 opens the digital video 620 at the timestamp 612b that matches the location of the search query 608. Notably, in one or more embodiments, the time-travel content search system 108 can include an alternative link to multiple timestamps (e.g., three, four, or more timestamps) that corresponds to multiple locations (e.g., a third, fourth, or more snapshots) within the video thumbnail 612 associated with results for the search query 608. Alternatively, based on a client device interaction with the timestamp 612b, the time-travel content search system 108 opens the digital video 620 at the timestamp 612b that matches the location of the search query 608. In certain implementations, based on an interaction with the video thumbnail 612 (or timestamp 612b), the time-travel content search system 108 opens the associated video application (e.g., the video application from the recorded snapshot) to the location of the video as shown at the timestamp 612b that matches the location of the search query 608.

As also shown in FIG. 6, the time-travel content search system 108 generates search results including the video thumbnail 614 representing a digital video containing assembled snapshots of a digital document 624. As shown, the time-travel content search system 108 provides the video thumbnail 614 with title 614a (e.g., Document1.txt) positioned at timestamp 614b (e.g., 2023-08-01 14:12). To illustrate, as shown, the video thumbnail 614 displays a portion of a digital video where the word "Raven" appears within the digital document 624. In certain implementations, as shown, based on a client device interaction with the video thumbnail 614 (or timestamp 614b) the time-travel content search system 108 opens the associated document editing application (e.g., the document editing application indicated by the recorded snapshot) to present the content of the digital document 624 shown at the timestamp 614b (e.g., to match the location of the search query 608). In certain implementations (similar to the description relating to digital video 620), based on a client device interaction with the video thumbnail 614 (or timestamp 614b) the time-travel content search system 108 displays a digital video representing assembled snapshots of the document editing application at the timestamp 614b that matches the location for results of the search query 608.

As also shown in FIG. 6, the time-travel content search system 108 generates search results including the video thumbnail 616 representing a digital video containing assembled snapshots of an email application 626. As shown, the time-travel content search system 108 provides the video thumbnail 616 with title 616*a* (e.g., email1) positioned at timestamp 616*b* (e.g., 2023-07-22 18:31). In certain implementations, the time-travel content search system 108 displays the content of the digital video at the timestamp 616*b* that provides the best match within the digital video for the location of results for the search query 608 as the video thumbnail 616. For example, as shown, the video thumbnail 616 displays a portion of the video where the word "Raven" is displayed on the screen. As also shown, the time-travel content search system 108 includes an alternative link to a timestamp 616*c* (e.g., 2023-08-01 12:31) that corresponds to another location within the digital video associated with results for the search query 608.

Furthermore, as shown, based on a client device interaction with the video thumbnail 616 (or timestamp 616*b*), the time-travel content search system 108 opens the email application 626 and the email containing the word "Raven" which is depicted at the timestamp 616*b* (e.g., to match the location of the search query 608). Alternatively, based on a client device interaction with the timestamp 612*c*, the time-travel content search system 108 opens the email application 626 at the location of the email containing the word "Raven" and depicted at the alternate timestamp 616*c* (e.g., to match the location of the search query 608). In certain implementations (similar to the description relating to digital video 620), based on a client device interaction with the video thumbnail 616 (or timestamp 616*b*) the time-travel content search system 108 displays a digital video representing assembled snapshots of the email application 626 at the timestamp 614*b* that matches the location for results of the search query 608.

Furthermore, the search results can also include a video thumbnail representing a digital video of assembled snapshots of across an entire user desktop or across multiple applications used during a login session. Similarly, the search results can include timestamps and links to locations within the digital video for the assembled snapshots of the user desktop. Furthermore, based on a client device interaction with the video thumbnail, the time-travel content search system 108 can open the digital video of assembled snapshots of the user desktop (e.g., at a specified timestamp).

Additionally, the search results can also include a video thumbnail representing a digital video of assembled snapshots of a combination of different applications. Similarly, the search results can include timestamps and links to locations within the digital video for the assembled snapshots of the combination of different applications. Furthermore, based on a client device interaction with the video thumbnail, the time-travel content search system 108 can open the digital video of assembled snapshots of the combination of different applications (e.g., at the specified timestamp). Additionally, based on a client device interaction with the video thumbnail, the time-travel content search system 108 can open one or more of the different application and associated content (e.g., content displayed at the specified timestamp).

As mentioned, the time-travel content search system 108 can provide search results including snapshots of content displayed on a display screen over time. FIGS. 7A-7D illustrate examples of utilizing selectable search results generated by the time-travel content search system in accordance with one or more embodiments.

Figure 7A:
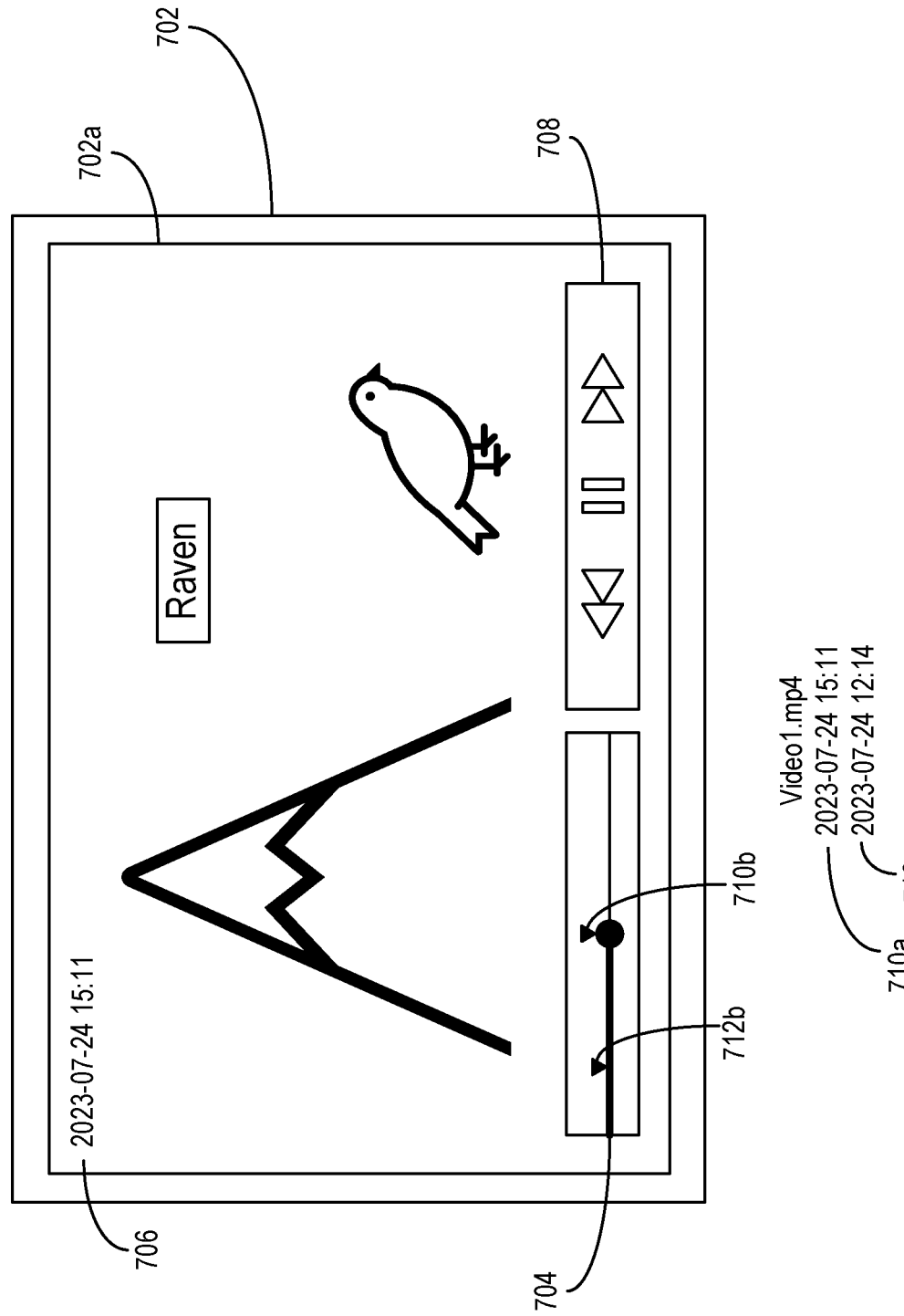
FIGS. 7A-7D illustrate examples of utilizing selectable search results generated by the time-travel content search system in accordance with one or more embodiments.

Turning to FIG. 7A, the time-travel content search system 108 can provide search results that include a digital video 702*a* which includes a compilation of snapshots depicting content captured from a display screen over time. As shown, the time-travel content search system 108 can provide tools for the client device to interact with the digital video 702*a*. For example, the time-travel content search system 108 provides a playback window 702 for playing and scrubbing through the snapshots included within the digital video 702*a*. As shown, the playback window 702 includes a scrubbing tool 704 which provides an interface to navigate through the digital video 702*a* timeline to different parts of the digital video 702*a* (e.g., by dragging indicator within the scrubbing tool 704). As also shown, the playback window can include an indicator 710*b* pinpointing the location of timestamp 712*a* and an indicator 712*b* pinpointing the location of timestamp 712*a* within the digital video 702*a*.

As also shown in FIG. 7A, the time-travel content search system 108 can initially position the scrubbing tool 704 at the indicator 710*b*, which is the location of the search query shown by the timestamp 706 (e.g., 2023-07-24 15:11). As further shown, the playback window 702 includes a navigation tool 708 to navigate through the digital video 702*a* and play, pause, fast forward, and rewind the digital video 702*a*. In addition, the time-travel content search system 108 provides an interface to quickly jump to positions within the digital video 702*a* that include content relevant to the search query. For example, the time-travel content search system 108 includes a link to timestamp 710*a* and timestamp 712*a* which refer to positions within the digital video 702*a* containing content associated with the search query. After receiving an indication of an interaction with the link to timestamp 710*a* or timestamp 712*a*, the time-travel content search system 108 positions the digital video 702*a* to the location of the respective timestamp and displays the relevant search query results.

Figure 7B:
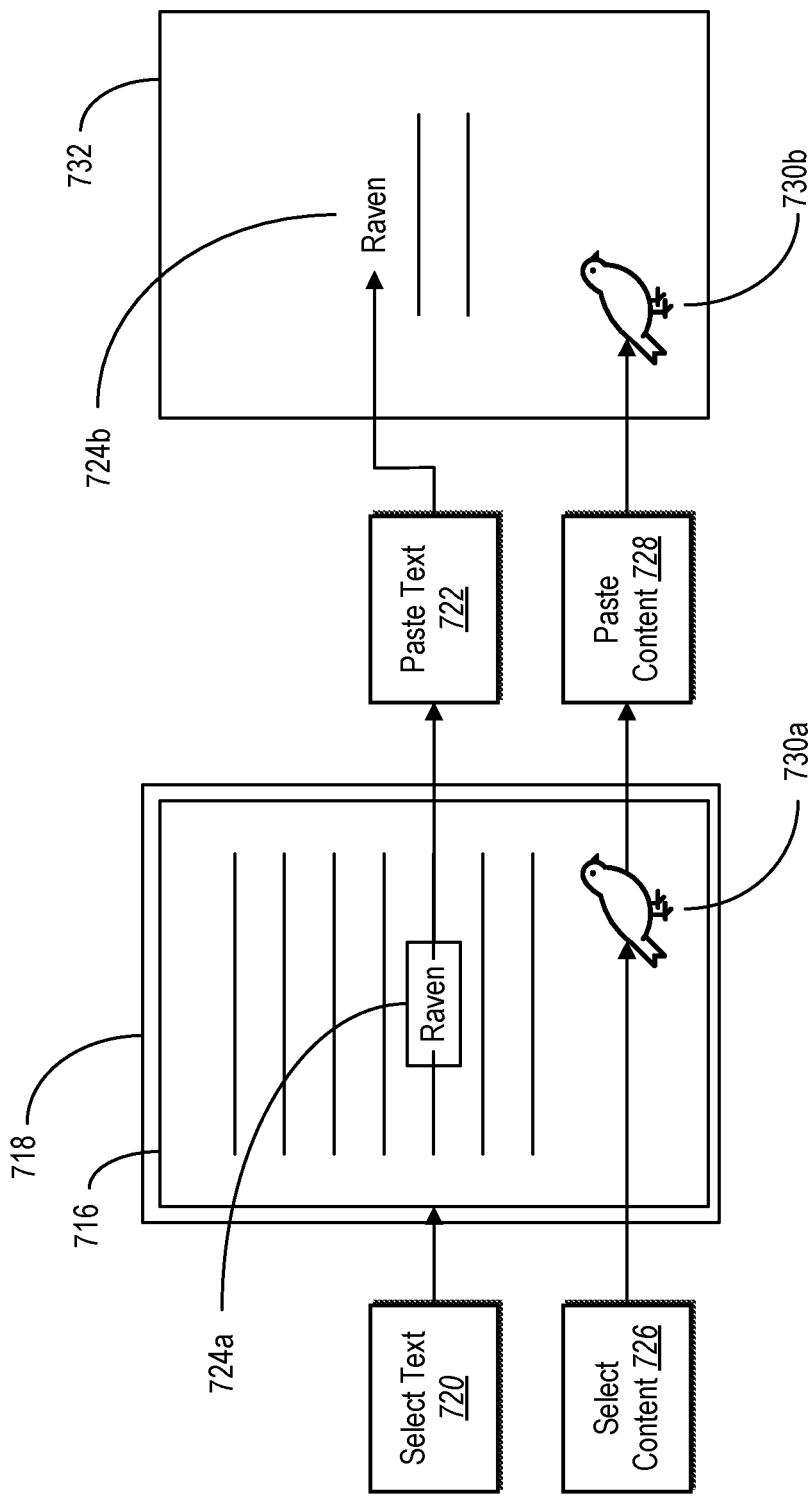

As shown in FIG. 7B, the search results can include accessing the digital document 716 within a snapshot 718. For example, the snapshot 718 contains a representation of the digital document 716 with content items of text 724*a* and content 730*a* associated with the search query. As further shown, the time-travel content search system 108 provides an interface (e.g., by accessing the snapshot associated with the digital document) to perform the act 720 and copy the text 724*a* and perform the act 722 to paste the text 724*b* into a new document or application (e.g., directly from the snapshot 718). As further shown, the time-travel content search system 108 provides an interface to perform the act 726 and select the content 730*a* and perform the act 728 to paste the content 730*b* into a new location 732 (e.g., a document or application).

Figure 7C:
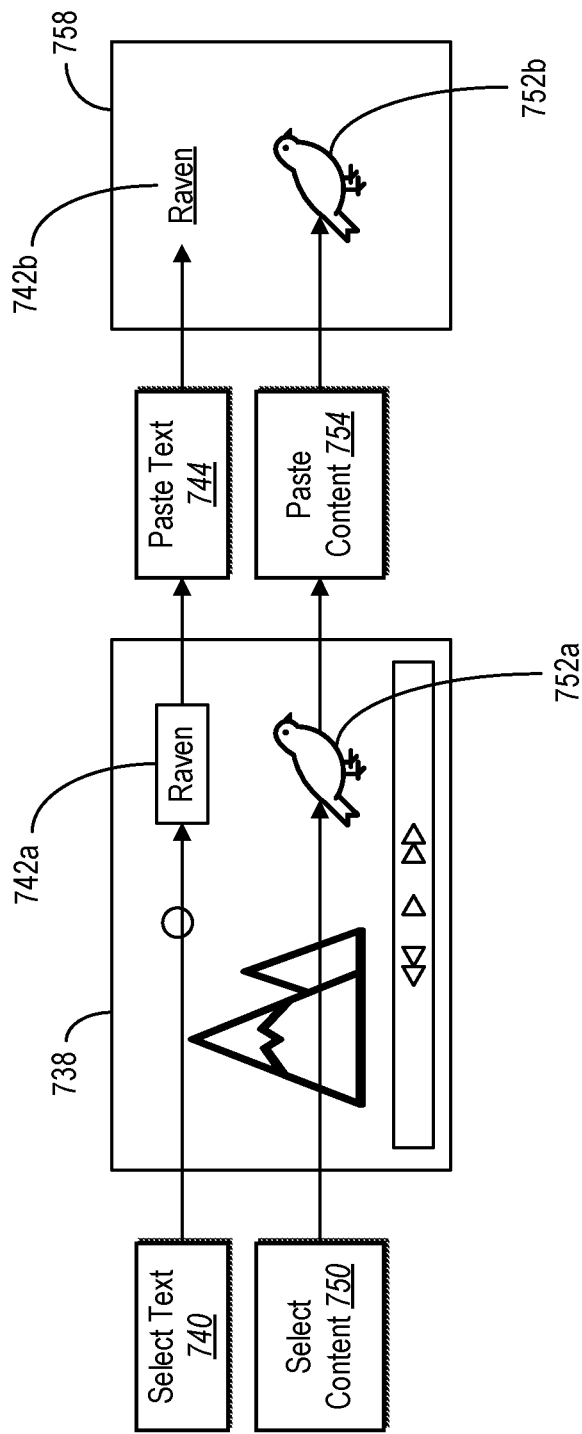

As further shown in FIG. 7C, based on a client device interaction with the search results (e.g., the video thumbnail 612), the time-travel content search system 108 can access the digital video 738. As shown, the digital video 738 includes selectable content items of text 742*a* and content 752*a* associated with the search query. To illustrate, the time-travel content search system 108 provides the digital video 738 based on a user interaction with the video thumbnail 612 (e.g., the thumbnail view of the snapshot at timestamp 612*b* shown in FIG. 6) and generates selectable text from the digital video 738 depicted in the video thumbnail 612. In particular, the time-travel content search system 108 can utilize a content conversion model (e.g., the content conversion model 504) to convert one or more content items within the digital video 738 into selectable content (e.g., selectable text or selectable images). Furthermore, the time-travel content search system 108 can provide an interface to perform the act 740 and select the selectable content item of text 724a and perform the act 744 to paste the text 742b into a new document or application. As further shown, the time-travel content search system 108 provides an interface to perform the act 750 and select the selectable content item of content 752a and perform the act 754 to paste the content 752b into a new location 758 (e.g., a document or application).

Figure 7D:
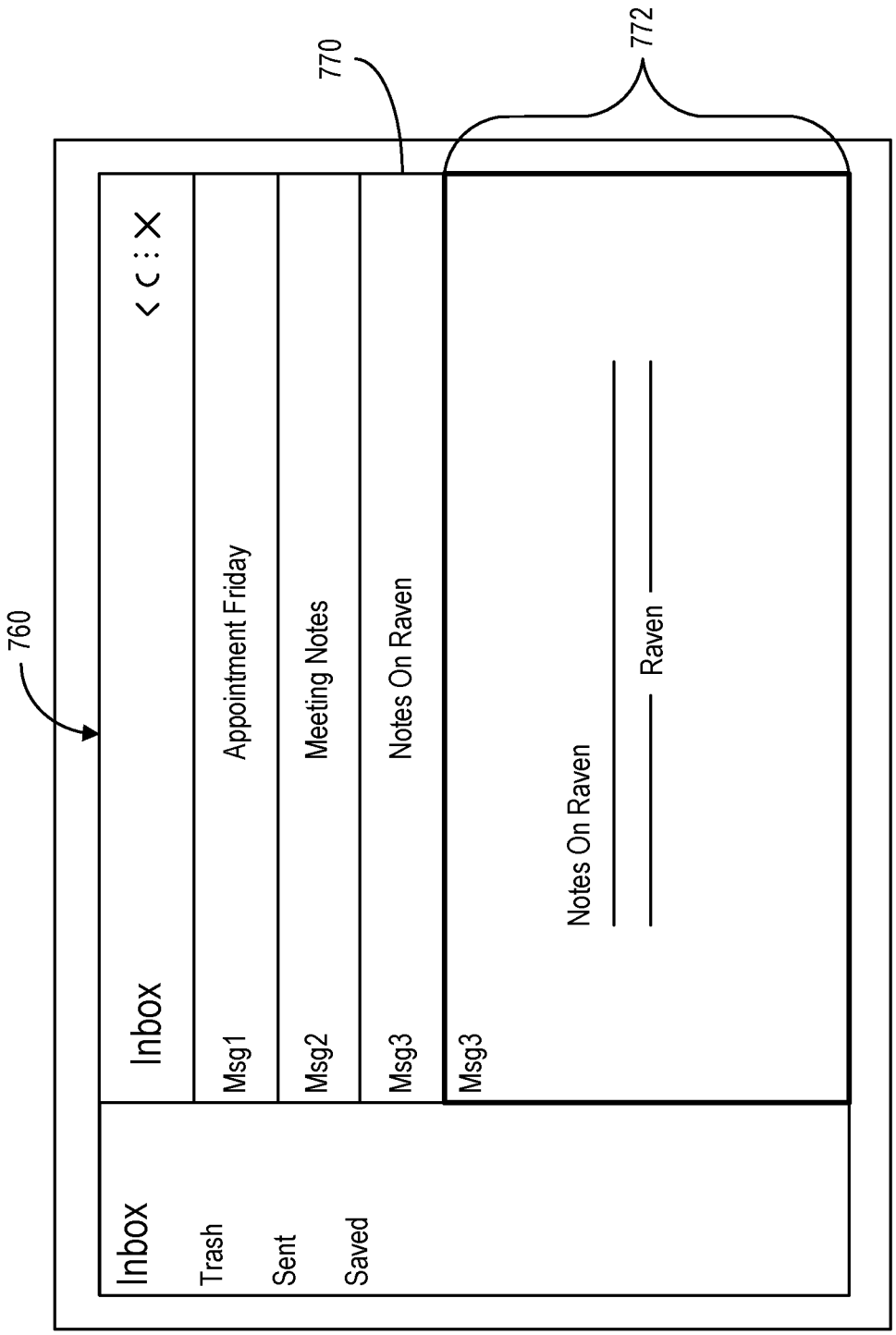

As an additional example shown in FIG. 7D, the time-travel content search system 108 can open a content item related to the search query within an associated application. As shown, the time-travel content search system 108 can open or access content items and/or applications directly from content within selected snapshots in a search result (without requiring independently opening the computer application and navigating to the content). Indeed, the time-travel content search system 108 stores application data for each snapshot, indicating the application and/or location of digital content presented in each one. Thus, upon selection in a search result, the system can open the exact content item and/or application shown in the snapshot. For example, in response to a selection of the word "Raven" in a snapshot, the time-travel content search system 108 opens an email application 760 that includes the content item 770 of msg3 that relates to the word "Raven." The time-travel content search system 108 can select the relevant content item 770 within the email application 760 as shown by the selected email view 772.

Relatedly, the time-travel content search system 108 can open a variety of content items related to the search query within a variety of associated applications based upon the captured snapshots. For example, the time-travel content search system 108 can open a webpage within a web browser (e.g., based on a saved URL or timestamp), a video within a video player, a document within a word processor, an image within image editing software, a spreadsheet within presentation software, an e-book within an e-book reader, and/or code within an integrated development environment. To illustrate, based on a client device interaction with the search results (e.g., the video thumbnail 614), the time-travel content search system 108 can access the digital document 716 within the associated word processing application. For example, the time-travel content search system 108 can determine application location data which includes computer instructions for accessing the digital content (e.g., the digital document 716) of a snapshot within the word processing application and can utilize the application location data to provide application-specific search results.

FIGS. 1-7D, the corresponding text, and the examples provide a number of different systems and methods for generating, searching, and retrieving digital content utilizing captured snapshots. In addition to the foregoing, implementations can also be described in terms of flowcharts comprising acts/steps in a method for accomplishing a particular result. For example, FIG. 8 illustrates an example series of acts for capturing snapshots and generating search results accordance with one or more embodiments.

Figure 8:
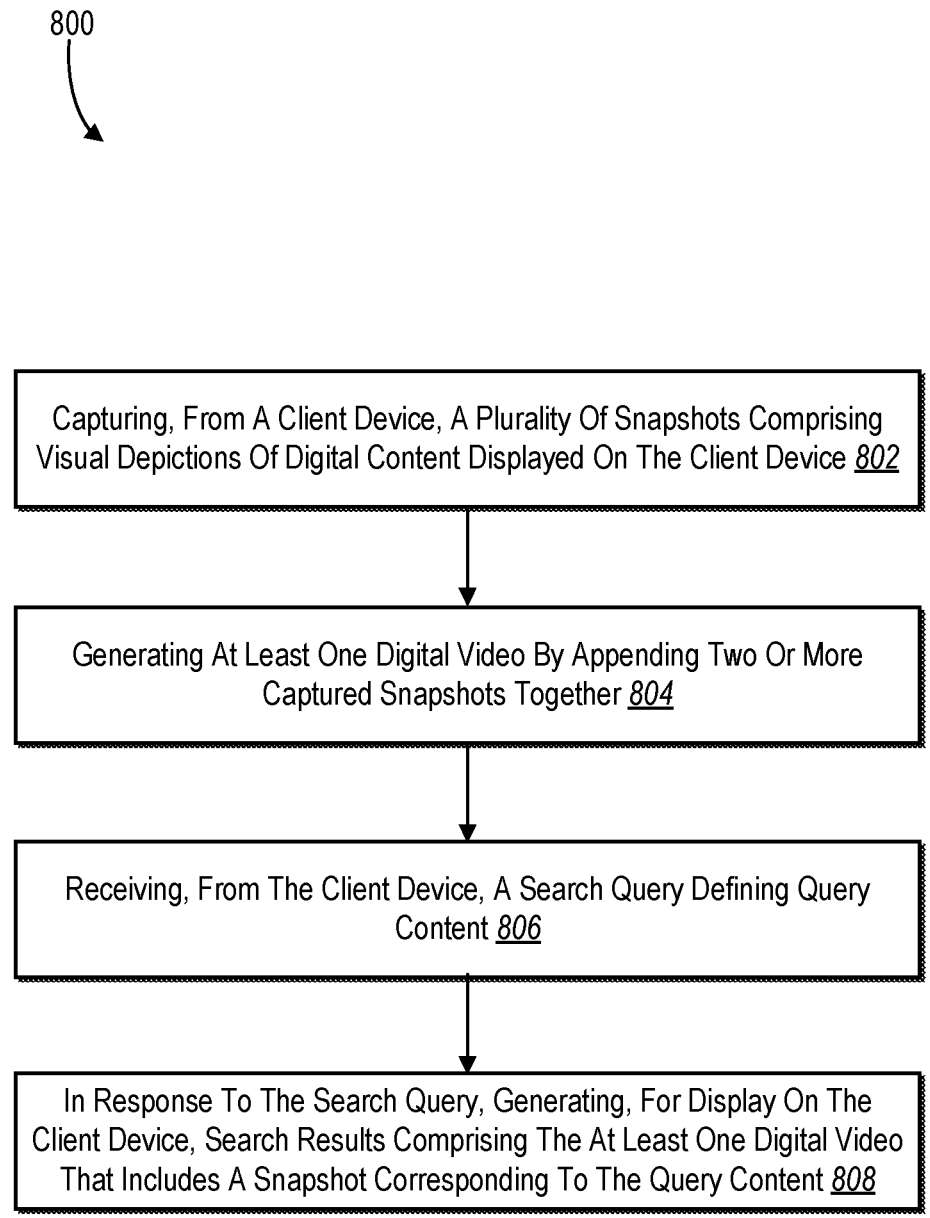
FIG. 8 illustrates a flowchart of a series of acts for capturing snapshots and generating search results accordance with one or more embodiments.

As illustrated in FIG. 8, the series of acts 800 may include an act 802 of capturing, from a client device, a plurality of snapshots comprising visual depictions of digital content displayed on the client device. For example, in one or more embodiments, the act 802 can include capturing, from a client device, a plurality of snapshots comprising visual depictions of digital content displayed on the client device throughout navigation of at least one computer application. In addition, the series of acts 800 includes an act 804 of generating at least one digital video by appending two or more captured snapshots together. For example, in one or more embodiments, the act 804 can include generating, from the digital content of the plurality of snapshots captured from the client device, at least one digital video by appending two or more captured snapshots together. In addition, the series of acts 800 includes an act 806 receiving, from the client device, a search query defining query content. As further illustrated in FIG. 8, the series of acts 800 includes an act 808 of, in response to the search query, generating, for display on the client device, search results comprising the at least one digital video that includes a snapshot corresponding to the query content.

Further, in one or more embodiments, the series of acts 800 includes capturing digital content displayed across multiple computer applications running on the client device during a login session. In addition, in one or more embodiments, the series of acts 800 includes determining, for the snapshot included within the at least one digital video of the search results, application location data including computer instructions for accessing digital content of the snapshot within a computer application; and in response to a selection of a digital video within the search results, accessing the digital content of the snapshot by using the computer application to execute the computer instructions.

Furthermore, in one or more embodiments, the series of acts 800 includes extracting, utilizing a topic extraction model, topics associated with the plurality of snapshots. Additionally, in one or more embodiments, the series of acts 800 includes generating the search results based on a threshold similarity between the topics associated with the plurality of snapshots. Moreover, in one or more embodiments, the series of acts 800 includes detecting, from the digital content of the plurality of snapshots captured from the client device, sensitive information displayed on the client device. Moreover, in one or more embodiments, the series of acts 800 includes disabling the capture of additional snapshots depicting sensitive information in response to detecting the sensitive information.

Additionally, in one or more embodiments, the series of acts 800 includes determining a computer application type designated as impermissible for capturing snapshots. Furthermore, in one or more embodiments, the series of acts 800 includes determining, from among one or more computer applications, a computer application type designated as impermissible for capturing snapshots. In addition, in one or more embodiments, the series of acts 800 includes excluding digital content accessed via the computer application as part of capturing the plurality of snapshots from the at least one computer application of a computer application type designated as impermissible for capturing snapshots. Additionally, in one or more embodiments, the series of acts 800 includes generating a thumbnail of the at least one digital video positioned at a timestamp for depicting the snapshot corresponding to the query content. In addition, in one or more embodiments, the series of acts 800 includes in response to a selection of a thumbnail, providing a playback window for playing and scrubbing through snapshots included within at least one digital video.

Furthermore, in one or more embodiments, the series of acts 800 includes capturing, from a client device, a plurality of snapshots comprising visual depictions of digital content displayed on the client device throughout navigation of at least one computer application. In addition, in one or more embodiments, the series of acts 800 includes generating at least one digital video by appending together two or more captured snapshots from among the plurality of snapshots. In addition, in one or more embodiments, the series of acts 800 includes receiving, from the client device, a search query defining query content; and in response to the search query, generating, for display on the client device, search results comprising the at least one digital video that includes a snapshot corresponding to the query content.

Moreover, in one or more embodiments, the series of acts 800 includes generating textual content from the digital content of the plurality of snapshots captured from the client device. In addition, in one or more embodiments, the series of acts 800 includes, in response to the search query, generating the search results by searching the textual content for content corresponding to the query content. Furthermore, in one or more embodiments, the series of acts 800 includes generating text representing content depicted within the plurality of snapshots captured from the client device. Moreover, in one or more embodiments, the series of acts 800 includes utilizing a content conversion model to generate the textual content by converting visual content depicted within the plurality of snapshots captured from the client device into text.

Additionally, in one or more embodiments, the series of acts 800 includes capturing digital content displayed on the client device during a specified time-period. Further, in one or more embodiments, the series of acts 800 includes determining, from among the at least one computer application, a computer application designated as impermissible for capturing snapshots; and excluding digital content accessed via the computer application as part of capturing the plurality of snapshots from the at least one computer application. Moreover, in one or more embodiments, the series of acts 800 includes generating selectable text from the at least one digital video included in the search results.

Additionally, in one or more embodiments, the series of acts 800 includes capturing, from a client device, a first snapshot and a second snapshot comprising visual depictions of digital content displayed on the client device. Further, in one or more embodiments, the series of acts 800 includes generating, from the digital content of the first snapshot captured from the client device and the digital content of the second snapshot captured from the client device, at least one digital video by appending the first snapshot and the second snapshot together. Moreover, in one or more embodiments, the series of acts 800 includes receiving, from the client device, a search query defining query content. In addition, in one or more embodiments, the series of acts 800 includes in response to the search query, generating, for display on the client device, search results comprising the at least one digital video that includes the first snapshot and the second snapshot corresponding to the query content.

Moreover, in one or more embodiments, the series of acts 800 includes identifying, within the at least one digital video, a third snapshot corresponding to the query content. In addition, in one or more embodiments, the series of acts 800 includes in response to the search query, generating, as part of the search results, a visual indication of a third snapshot within a thumbnail view of the at least one digital video. Additionally, in one or more embodiments, the series of acts 800 includes capturing a first set of snapshots for content depicted within a first computer application running on the client device. Moreover, in one or more embodiments, the series of acts 800 includes capturing a second set of snapshots for content depicted within a second computer application running on the client device.

Further, in one or more embodiments, the series of acts 800 includes ranking a first snapshot and a second snapshot according to relevance in relation to the query content. Additionally, in one or more embodiments, the series of acts 800 includes based on ranking the first snapshot and the second snapshot, providing the first snapshot for display as a thumbnail view of the at least one digital video within the search results. Moreover, in one or more embodiments, the series of acts 800 includes generating selectable text from content depicted within the thumbnail view of the first snapshot. In addition, in one or more embodiments, the series of acts 800 includes capturing the first snapshot of initial digital content displayed on the client device throughout navigation of at least one computer application. Further, in one or more embodiments, the series of acts 800 includes detecting at least a threshold change from the initial digital content to new digital content displayed on the client device operating the at least one computer application.

In addition, in one or more embodiments, the series of acts 800 includes capturing the second snapshot of the new digital content based on detecting the threshold change from the initial digital content to the new digital content. Furthermore, in one or more embodiments, the series of acts 800 includes comparing pixels of the first snapshot and the second snapshot to determine that the first snapshot and the second snapshot satisfy a dissimilarity threshold. Additionally, in one or more embodiments, the series of acts 800 includes storing the first snapshot and the second snapshot based on determining that the first snapshot and the second snapshot satisfy the dissimilarity threshold.

In one or more implementations, each of the components of the time-travel content search system 108 are in communication with one another using any suitable communication technologies. Additionally, the components of the time-travel content search system 108 can be in communication with one or more other devices including one or more client devices described above. It will be recognized that in as much the time-travel content search system 108 is shown to be separate in the above description, any of the subcomponents may be combined into fewer components, such as into a single component, or divided into more components as may serve a particular implementation.

Figure 9:
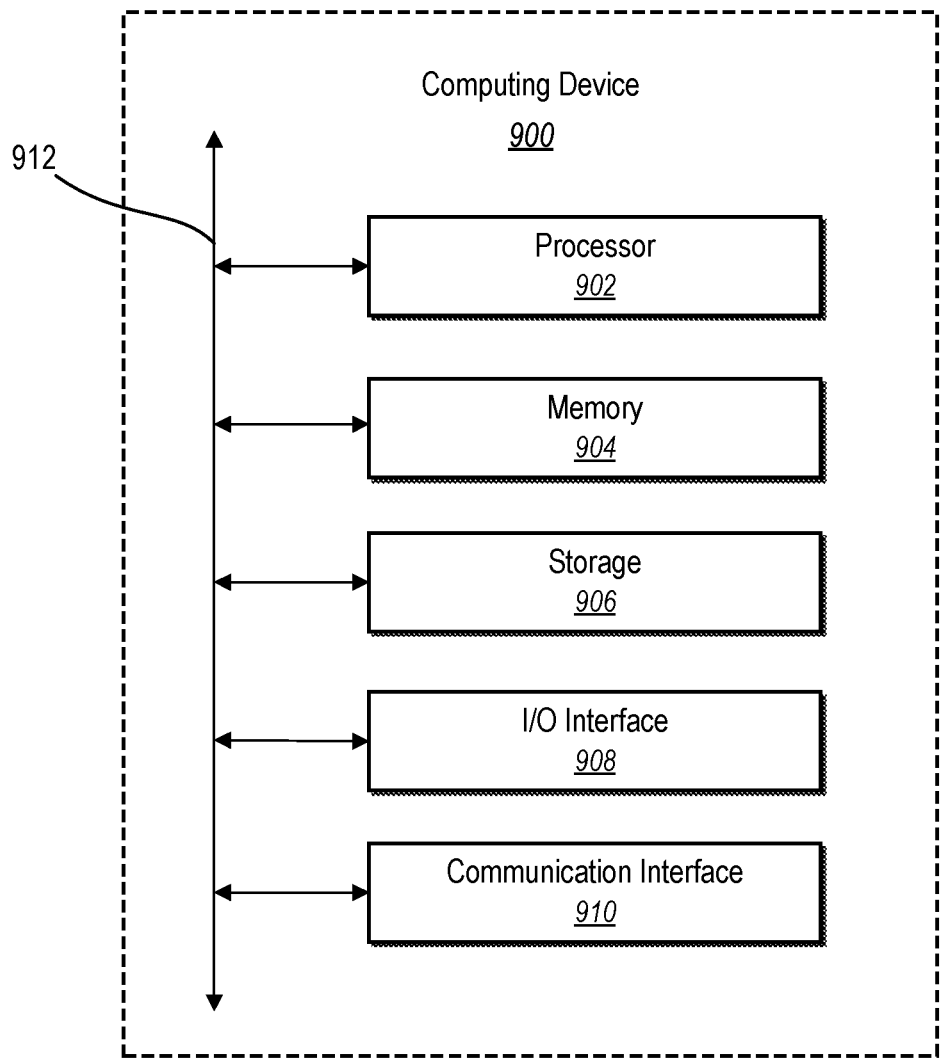
FIG. 9 illustrates a block diagram of an exemplary computing device in accordance with one or more embodiments.

FIG. 9 illustrates a block diagram of exemplary computing device 900 that may be configured to perform one or more of the processes described above. The components of the time-travel content search system 108 can include software, hardware, or both. For example, the components of the time-travel content search system 108 can include one or more instructions stored on a computer-readable storage medium and executable by processors of one or more computing devices (e.g., the computing device 900). When executed by the one or more processors, the computer-executable instructions of the time-travel content search system 108 can cause the computing device 900 to perform the methods described herein. Alternatively, the components of the time-travel content search system 108 can comprise hardware, such as a special purpose processing device to perform a certain function or group of functions. Additionally, or alternatively, the components of the time-travel content search system 108 can include a combination of computer-executable instructions and hardware.

Furthermore, the components of the time-travel content search system 108 performing the functions described herein may, for example, be implemented as part of a stand-alone application, as a module of an application, as a plug-in for applications including content management applications, as a library function or functions that may be called by other applications, and/or as a cloud-computing model. Thus, the components of the time-travel content search system 108 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 9 illustrates a block diagram of exemplary computing device 900 that may be configured to perform one or more of the processes described above. One will appreciate that third-party server(s) 114, the client device(s) 124, and/or the computing device 900 may comprise one or more computing devices such as computing device 900. As shown by FIG. 9, computing device 900 can comprise processor 902, memory 904, a storage device, a I/O interface, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example, and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example, and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 904 may be internal or distributed memory.

Storage device 906 includes storage for storing data or instructions. As an example, and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
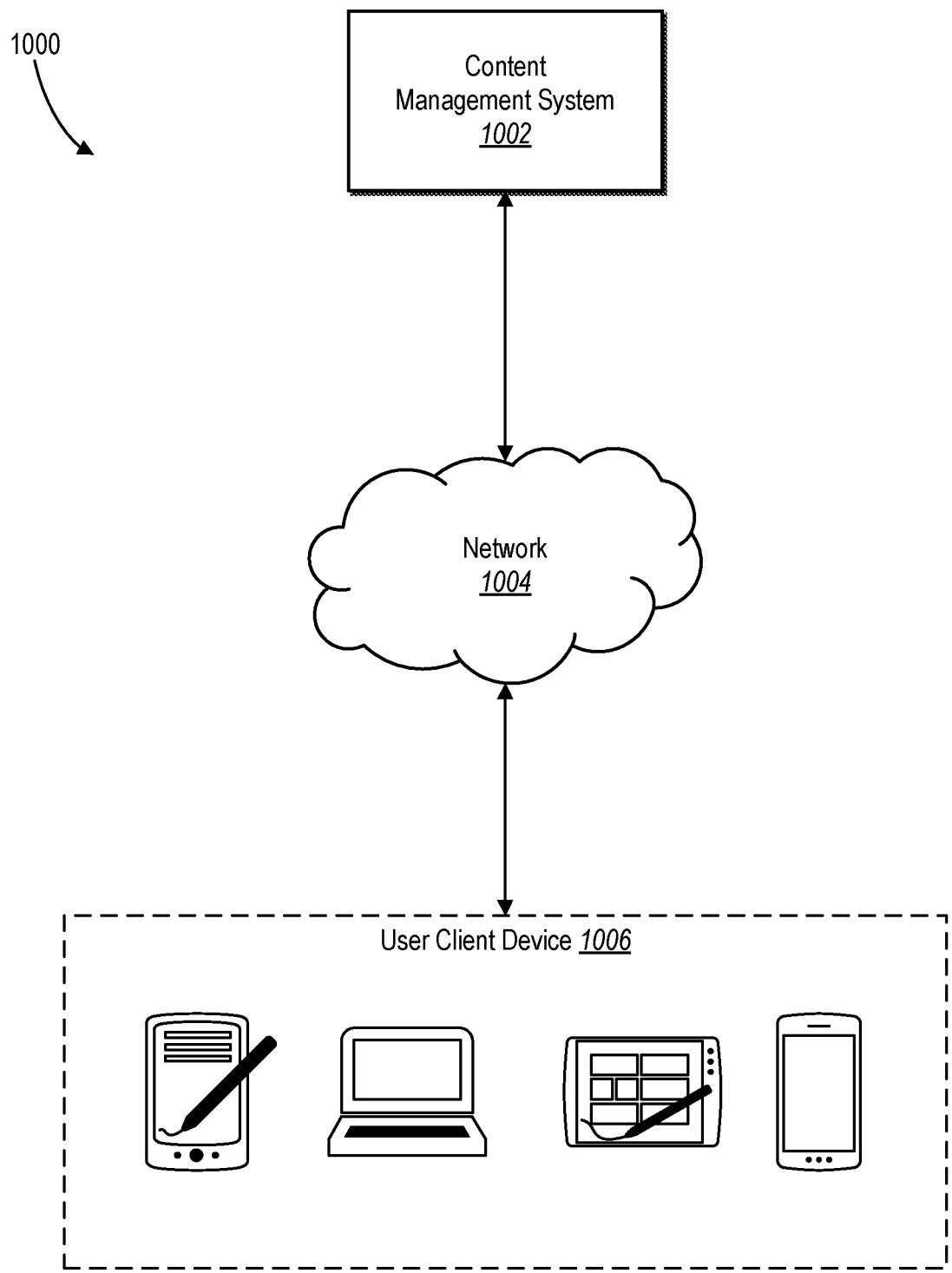
FIG. 10 illustrates a networking environment of a time-travel content search system in accordance with one or more embodiments.

FIG. 10 is a schematic diagram illustrating environment 1000 within which one or more implementations of the time-travel content search system 108 can be implemented. As discussed above with respect to FIG. 1, in some embodiments the time-travel content search system can be part of a time-travel content search system. In such cases, the time-travel content search system can perform various functions a time-travel content search system performs, as described below. The time-travel content search system 1002 may generate, store, manage, receive, and send digital content (such as digital videos). For example, time-travel content search system 1002 may send and receive digital content to and from the user client device 1006 by way of network 1004. In particular, the time-travel content search system 1002 can store and manage a collection of digital content. The time-travel content search system 1002 can manage the sharing of digital content between computing devices associated with a plurality of users. For instance, the time-travel content search system 1002 can facilitate a user sharing a digital content with another user of time-travel content search system 1002.

In particular, the time-travel content search system 1002 can manage synchronizing digital content across multiple of the user client device 1006 associated with one or more users. For example, a user may edit digital content using user client device 1006. The time-travel content search system 1002 can cause user client device 1006 to send the edited digital content to time-travel content search system 1002. Time-travel content search system 1002 then synchronizes the edited digital content on one or more additional computing devices.

In addition to synchronizing digital content across multiple devices, one or more implementations of time-travel content search system 1002 can provide an efficient storage option for users that have large collections of digital content. For example, time-travel content search system 1002 can store a collection of digital content on time-travel content search system 1002, while the user client device 1006 only stores reduced-sized versions of the digital content. A user can navigate and browse the reduced-sized versions (e.g., a thumbnail of a digital image) of the digital content on user client device 1006. In particular, one way in which a user can experience digital content is to browse the reduced-sized versions of the digital content on user client device 1006.

Another way in which a user can experience digital content is to select a reduced-size version of digital content to request the full- or high-resolution version of digital content from time-travel content search system 1002. In particular, upon a user selecting a reduced-sized version of digital content, user client device 1006 sends a request to time-travel content search system 1002 requesting the digital content associated with the reduced-sized version of the digital content. Time-travel content search system 1002 can respond to the request by sending the digital content to user client device 1006. User client device 1006, upon receiving the digital content, can then present the digital content to the user. In this way, a user can have access to large collections of digital content while minimizing the amount of resources used on user client device 1006.

User client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1006 may access time-travel content search system 1002.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   capturing, from a client device, a plurality of snapshot images by capturing static visual depictions of digital content displayed on the client device throughout navigation of at least one computer application, wherein the plurality of snapshot images comprise pixel representations of the digital content;
   generating, from the digital content of the plurality of snapshot images captured from the client device, a digital video by combining two or more captured snapshot images as frames of the digital video;
   receiving, from the client device, a search query defining query content;
   determining, for the digital video, a confidence score by performing a semantic comparison of the search query and the digital video; and
   generating, for display on the client device, search results for the search query comprising a captured snapshot image included as one of the frames of the digital video based on the confidence score.

2. The computer-implemented method of claim 1, wherein capturing the plurality of snapshot images comprises capturing digital content displayed across multiple computer applications running on the client device during a login session.

3. The computer-implemented method of claim 1, further comprising:
  determining, for the captured snapshot image included as a frame the digital video of the search results, application location data including computer instructions for accessing digital content of the captured snapshot image within a computer application; and
  in response to a selection of a digital video within the search results, accessing the digital content of the captured snapshot image by using the computer application to execute the computer instructions.

4. The computer-implemented method of claim 1, wherein generating the search results further comprises:
  extracting, utilizing a topic extraction model, topics associated with the plurality of snapshot images; and
  generating the search results based on a threshold similarity between the topics associated with the plurality of snapshot images.

5. The computer-implemented method of claim 1, wherein capturing the plurality of snapshot images comprises:
  detecting, from the digital content of the plurality of snapshot images captured from the client device, personally identifiable information displayed on the client device; and
  disabling further capture beyond the plurality of snapshot images depicting the personally identifiable information in response to detecting the personally identifiable information.

6. The computer-implemented method of claim 1, further comprising:
  determining a computer application type designated as impermissible for capturing snapshot images;
  determining, from among the at least one computer application, a computer application of the computer application type; and
  excluding digital content accessed via the computer application as part of capturing the plurality of snapshot images from the at least one computer application.

7. The computer-implemented method of claim 1, wherein generating the search results comprises:
  generating a thumbnail of the digital video positioned at a timestamp for depicting the captured snapshot image that corresponds to the query content; and
  in response to a selection of the thumbnail, providing a playback window for playing and scrubbing through captured snapshot images included within the digital video.

8. A system comprising:
at least one processor; and
a non-transitory computer readable medium comprising instructions that, when executed by the at least one processor, cause the system to:
  capture, from a client device, a plurality of snapshot images by capturing static visual depictions of digital content displayed on the client device throughout navigation of at least one computer application, wherein the plurality of snapshot images comprise pixel representations of the digital content;
  generate a digital video by combining two or more captured snapshot images from among the plurality of snapshot images;
  receive, from the client device, a search query defining query content;
  determine, for the digital video, a confidence score by performing a semantic comparison of the search query and the digital video; and
  generate, for display on the client device, search results for the search query comprising a captured snapshot image as a frame of the digital video based on the confidence score.

9. The system of claim 8, further comprising instructions that, when executed by the at least one processor, cause the system to:
  generate textual content from the digital content of the plurality of snapshot images captured from the client device; and
  in response to the search query, generate the search results by searching the textual content for content corresponding to the query content.

10. The system of claim 9, further comprising instructions that, when executed by the at least one processor, cause the system to generate the textual content by generating text representing content depicted within the plurality of snapshot images captured from the client device.

11. The system of claim 9, further configured to generate the textual content by utilizing a content conversion model to generate the textual content by converting visual content depicted within the plurality of snapshot images captured from the client device into text.

12. The system of claim 8, further comprising instructions that, when executed by the at least one processor, cause the system to capture the plurality of snapshot images by capturing digital content displayed on the client device during a specified time-period.

13. The system of claim 8, further comprising instructions that, when executed by the at least one processor, cause the system to:
  determine, from among the at least one computer application, a computer application designated as impermissible for capturing snapshot images; and
  exclude digital content accessed via the computer application as part of capturing the plurality of snapshot images from the at least one computer application.

14. The system of claim 8, further comprising instructions that, when executed by the at least one processor, cause the system to generate selectable text from the digital video included in the search results.

15. A non-transitory computer readable medium comprising instructions that, when executed by at least one processor, cause a computing device to:
  capture, from a client device, a first snapshot image and a second snapshot image by capturing static visual depictions of digital content displayed on the client device, wherein the first snapshot image and the second snapshot image comprise pixel representations of the digital content;
  generate, from the digital content of the first snapshot image captured from the client device and the digital content of the second snapshot image captured from the client device, a digital video by combining the first snapshot image and the second snapshot image together as frames of the digital video;
  receive, from the client device, a search query defining query content;
  determine, for the digital video, a confidence score by performing a semantic comparison of the search query and the digital video; and generate, for display on the client device, search results for the search query comprising the first snapshot image and the second snapshot image as frames of the digital video based on the confidence score.

16. The non-transitory computer readable medium of claim 15, further comprising instructions that, when executed by the at least one processor, cause the computing device to:
  identify, within the digital video, a third snapshot image corresponding to the query content; and
  in response to the search query, generate, as part of the search results, a visual indication of the third snapshot image within a thumbnail view of the digital video.

17. The non-transitory computer readable medium of claim 15, further comprising instructions that, when executed by the at least one processor, cause the computing device to:
  capture a first set of snapshot images for content depicted within a first computer application running on the client device; and
  capture a second set of snapshot images for content depicted within a second computer application running on the client device.

18. The non-transitory computer readable medium of claim 15, further comprising instructions that, when executed by the at least one processor, cause the computing device to:
  rank the first snapshot image and the second snapshot image according to relevance in relation to the query content;
  based on ranking the first snapshot image and the second snapshot image, provide the first snapshot image for display as a thumbnail view of the digital video within the search results; and
  generate selectable text from content depicted within the thumbnail view of the first snapshot image.

19. The non-transitory computer readable medium of claim 15, further comprising instructions that, when executed by the at least one processor, cause the computing device to capture the first snapshot image and the second snapshot image by:
  capturing the first snapshot image of initial digital content displayed on the client device throughout navigation of at least one computer application;
  detecting at least a threshold change from the initial digital content to new digital content displayed on the client device operating the at least one computer application; and
  capturing the second snapshot image of the new digital content based on detecting the threshold change from the initial digital content to the new digital content.

20. The non-transitory computer readable medium of claim 15, further comprising instructions that, when executed by the at least one processor, cause the computing device to:
  compare pixels of the first snapshot image and the second snapshot image to determine that the first snapshot image and the second snapshot image meets a dissimilarity threshold based on a dissimilarity between the pixels of the first snapshot image and the second snapshot image; and
  store the first snapshot image and the second snapshot image based on determining that the first snapshot image and the second snapshot image meets the dissimilarity threshold.

\* \* \* \* \*